United States Patent
Kosuda et al.

(10) Patent No.: US 12,372,015 B2
(45) Date of Patent: Jul. 29, 2025

(54) CONTROL DEVICE AND CONTROL METHOD FOR VARIABLE VALVE TIMING MECHANISM

(71) Applicant: Hitachi Astemo, Ltd., Hitachinaka (JP)

(72) Inventors: Masaki Kosuda, Hitachinaka (JP); Hirokazu Shimizu, Hitachinaka (JP); Nobuhiko Matsuo, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/284,211

(22) PCT Filed: Nov. 13, 2019

(86) PCT No.: PCT/JP2019/044516
§ 371 (c)(1),
(2) Date: Apr. 9, 2021

(87) PCT Pub. No.: WO2020/100939
PCT Pub. Date: May 22, 2020

(65) Prior Publication Data
US 2021/0340887 A1 Nov. 4, 2021

(30) Foreign Application Priority Data
Nov. 14, 2018 (JP) .................................. 2018-213400

(51) Int. Cl.
*F01L 1/352* (2006.01)
*F02D 13/02* (2006.01)
*F02D 41/20* (2006.01)

(52) U.S. Cl.
CPC .......... *F01L 1/352* (2013.01); *F02D 13/0238* (2013.01); *F01L 2201/00* (2013.01);
(Continued)

(58) Field of Classification Search
None
See application file for complete search history.

(56) References Cited

U.S. PATENT DOCUMENTS

| | | | |
|---|---|---|---|
| 2009/0118968 A1* | 5/2009 | Livshiz | F02D 37/02 701/102 |
| 2013/0247853 A1* | 9/2013 | Mikawa | F02N 19/004 123/90.15 |

(Continued)

FOREIGN PATENT DOCUMENTS

| | | | | |
|---|---|---|---|---|
| DE | 102008035982 A1 * | 6/2009 | | F01L 1/34 |
| JP | 2008-51111 A | 3/2008 | | |

(Continued)

OTHER PUBLICATIONS

DE-102008035982, English langauge machine translation (Year: 2009).*

(Continued)

*Primary Examiner* — Wesley G Harris
(74) *Attorney, Agent, or Firm* — Crowell & Moring LLP

(57) ABSTRACT

A control device and a control method for a variable valve timing mechanism are provided so as to improve the accuracy of cam phase angle interpolation without using a motor rotation angle sensor. The control device for the variable valve timing mechanism includes a controller configured to detect a phase angle of a cam based on a cam signal and control the phase angle of the cam by using an electric motor. The controller is configured such that a motor torque estimation unit calculates a motor torque from a motor current based on motor characteristics, a motor rotation-angle estimation unit calculates a motor rotation angle at least based on the motor torque and an engine operating state, and a conversion unit and a feedback control unit interpolate the cam phase angle of the variable valve timing mechanism from the motor rotation angle.

12 Claims, 23 Drawing Sheets

(52) U.S. Cl.
CPC ..... *F01L 2800/05* (2013.01); *F01L 2820/032* (2013.01); *F01L 2820/041* (2013.01); *F01L 2820/044* (2013.01); *F02D 2041/2058* (2013.01)

(56) References Cited

U.S. PATENT DOCUMENTS

| | | | | |
|---|---|---|---|---|
| 2014/0076251 | A1* | 3/2014 | Matsuo | F02D 13/0238 |
| | | | | 123/90.15 |
| 2018/0230865 | A1* | 8/2018 | Brown | H02K 29/08 |
| 2020/0095950 | A1* | 3/2020 | Picot | F02D 41/0087 |

FOREIGN PATENT DOCUMENTS

| | | | |
|---|---|---|---|
| JP | 2009257180 | A * | 11/2009 |
| JP | 2013-83187 | A | 5/2013 |
| JP | 2013083187 | A * | 5/2013 |
| JP | 2015-218623 | A | 12/2015 |
| JP | 2018-145874 | A | 9/2018 |

OTHER PUBLICATIONS

JP-2009257180-A, English Language Machine Translation (Year: 2009).*
International Search Report (PCT/ISA/210) issued in PCT Application No. PCT/JP2019/044516 dated Jan. 28, 2020 with English translation (five (5) pages).
Japanese-language Written Opinion (PCT/ISA/237) issued in PCT Application No. PCT/JP2019/044516 dated Jan. 28, 2020 (three (3) pages).
International Preliminary Report on Patentability (PCT/IB/338 & PCT/IPEA/409) issued in PCT Application No. PCT/JP2019/044516 dated May 14, 2021, including English translation of document C2 (Japanese-language Written Opinion (PCT/ISA/237) filed on Apr. 9, 2021) (six (6) pages).

* cited by examiner

FIG.18

| TORQUE | INFLUENCE ON PHASE CONVERSION | FIRST ORDER FACTOR | SECOND ORDER FACTOR |
|---|---|---|---|
| (A) MOTOR TORQUE | TORQUE FOR CONVERTING PHASE ANGLE OF CAM | MOTOR CURRENT | APPLIED VOLTAGE, MOTOR TEMPERATURE |
| (B) INERTIA TORQUE (VTC ACTUATOR) | TORQUE AS RESISTANCE TO CHANGE OF MOTOR TORQUE | MOTOR-ROTATION-ANGLE ACCELERATION, INERTIA MOMENT | — (ACTUATOR EIGENVALUE) |
| (C) FRICTION TORQUE (VTC ACTUATOR) | FRICTION RESISTANCE TORQUE APPLIED FOR VTC ACTUATOR IN PROPORTION TO MOTOR ROTATION SPEED | MOTOR ROTATION SPEED, FRICTION COEFFICIENT | — OIL TEMPERATURE |
| (D) CAM TORQUE | ALTERNATING TORQUE RECEIVED FROM VALVE ACCORDING TO ENGINE ROTATION ANGLE | ENGINE ROTATION ANGLE, ENGINE ROTATION SPEED | — |
| (E) INERTIA TORQUE (ENGINE) | TORQUE APPLIED ACCORDING TO ACCELERATION AND DECELERATION OF ENGINE ROTATION | ENGINE-ROTATION-ANGLE ACCELERATION, INERTIA MOMENT | ENGINE ROTATION SPEED (ACTUATOR EIGENVALUE) |
| (F) FRICTION TORQUE (ENGINE) | FRICTION RESISTANCE TORQUE AROUND CAM SHAFT | ENGINE ROTATION SPEED, FRICTION RESISTANCE | — OIL TEMPERATURE |

INFLUENCE OF APPLIED VOLTAGE

INFLUENCE OF MOTOR TEMPERATURE

CONTROL DEVICE AND CONTROL METHOD FOR VARIABLE VALVE TIMING MECHANISM

TECHNICAL FIELD

The present invention relates to a control device and a control method for a variable valve timing mechanism, in which a brushed DC motor is used and a voltage is applied to the motor only during phase conversion so as to rotate a motor shaft part relative to a sprocket part and convert the phase of a cam shaft part.

BACKGROUND ART

Patent Document 1 describes an electric valve timing adjuster for adjusting the valve timing of an engine by using the running torque of a motor. In Patent Document 1, the phase of a camshaft (camshaft phase) relative to an actual crankshaft is calculated based on a camshaft angle, a crankshaft angle, the temperature of lubricating oil, a coolant temperature, and the turning angle of a motor shaft, and a target camshaft phase is calculated according to engine operating conditions. The camshaft phase is calculated in synchronization with the rotation angle of the engine, thereby delaying updates during low revolutions. Thus, the turning angle of the motor shaft is detected using a motor rotation angle sensor, and the phase angle of a variable valve timing control (VTC) mechanism is interpolated.

REFERENCE DOCUMENT LIST

Patent Document

Patent Document 1: JP 2013-83187 A

SUMMARY OF THE INVENTION

Problem to be Solved by the Invention

To reduce the cost of a VTC system, the removal of a motor rotation angle sensor has been examined. For this purpose, phase angle interpolation may be performed according to a motor current by using, for example, the torque-current (T-I) characteristics and the torque-rotating speed (T-N) characteristics of a DC motor.

Unfortunately, phase angle interpolation according to a motor current based on T-I characteristics and T-N characteristics may have low accuracy. A first factor in reducing accuracy is that the T-I characteristics and T-N characteristics are stationary characteristics, whereas VTC repeats a phase advance angle-retard angle by the forward/backward rotations of the motor, leading to a rapid change of a phase angle depending upon a change of a motor current. A second factor is that the T-I characteristics and T-N characteristics are the characteristics of the motor alone, whereas VTC is affected by various factors other than a motor torque, causing a change of a phase angle to exceed an actual change.

The present invention has been devised in view of these circumstances. An object of the present invention is to provide a control device and a control method for a variable valve timing mechanism so as to improve the accuracy of cam phase angle interpolation without using a motor rotation angle sensor.

Means for Solving the Problem

A control device for a variable valve timing mechanism according to an aspect of the present invention is a control device for a variable valve timing mechanism configured to detect the phase angle of a cam based on a cam signal and control the phase angle of the cam by using an electric motor, the control device including a controller configured to calculate a motor torque from a motor current based on motor characteristics, calculate a motor rotation angle at least based on the motor torque and an engine operating state, and interpolate the cam phase angle of the variable valve timing mechanism from the motor rotation angle, wherein the controller calculates the motor rotation angle by using an engine speed, an engine rotation angle, and an engine oil temperature in the calculation of the motor rotation angle.

A control method for a variable valve timing mechanism according to an aspect of the present invention is a control method for a variable valve timing mechanism configured to detect the phase angle of a cam based on a cam signal and control the phase angle of the cam by using an electric motor, the control method including: calculating a motor torque from a motor current based on motor characteristics, calculating a motor rotation angle at least based on the motor torque and an engine operating state, interpolating the cam phase angle of the variable valve timing mechanism from the motor rotation angle, and correcting the calculation of the motor rotation angle by using an engine speed, an engine rotation angle, and an engine oil temperature.

Effects of the Invention

According to the present invention, in interpolation between phase angle detections based on a cam signal, a motor torque is estimated from a motor current based on motor characteristics, and then a motor rotation angle is estimated to perform interpolation based on an equation of motion using the motor torque and an engine operating state. This can achieve cam phase angle interpolation with high accuracy without using a motor rotation angle sensor. Cam phase angle interpolation can be performed without using a motor rotation angle sensor, achieving cost reduction for a VTC system.

BRIEF DESCRIPTION OF THE DRAWINGS

FIG. 18 indicates torques for the phase conversion of electric VTC and the influencing factors of the torques;

MODE FOR CARRYING OUT THE INVENTION

Embodiments of the present invention will be described below with reference to the accompanying drawings.

Figure 1:
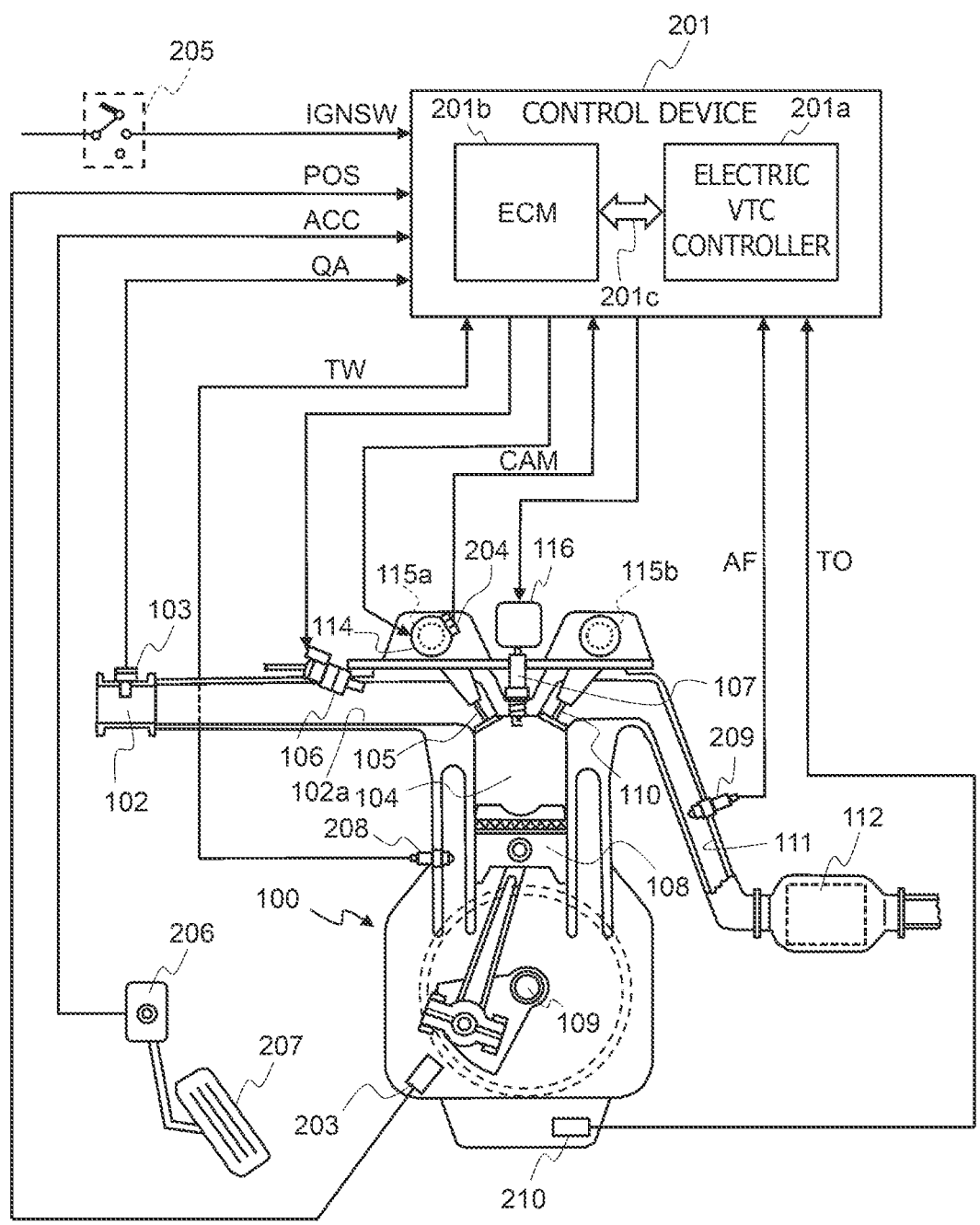
FIG. 1 is a system block diagram of an internal combustion engine to which a control device for a variable valve timing mechanism is applied according to the embodiments of the present invention.

FIG. 1 is a system block diagram of an internal combustion engine to which a control device for a variable valve timing mechanism is applied according to the embodiments of the present invention.

An internal combustion engine (engine) 100 is installed in a vehicle and is used as a power source. Internal combustion engine 100 illustrated as an in-line engine can be designed in various forms including a V-engine or a horizontally opposed engine.

An air intake duct 102 for internal combustion engine 100 has an intake air flow sensor 103 for detecting an intake air flow QA of internal combustion engine 100.

An air intake valve 105 opens and closes the inlet of a combustion chamber 104 of each cylinder. An air intake port 102a upstream of air intake valve 105 has a fuel injection valve 106 placed for each cylinder. In this example, fuel injection valve 106 injects fuel into air intake duct 102. The internal combustion engine may be a cylinder direct-injection combustion engine that directly injects fuel into the combustion chamber 104.

Fuel injected from fuel injection valve 106 is sucked with air into combustion chamber 104 through air intake valve 105 and is ignited and burned by spark ignition of an ignition plug 107, and a pressure by the combustion presses down a piston 108 toward a crankshaft 109, thereby rotating crankshaft 109.

An exhaust valve 110 opens and closes the outlet of combustion chamber 104. The opening of exhaust valve 110 ejects exhaust gas in combustion chamber 104 into an exhaust pipe 111.

Exhaust pipe 111 has a catalyst converter 112 containing a three-way catalyst or the like. Catalyst converter 112 purifies exhaust gas.

Air intake valve 105 opens in response to the rotation of an air intake camshaft 115a rotated by crankshaft 109. Exhaust valve 110 opens in response to the rotation of an exhaust camshaft 115b rotated by crankshaft 109.

A VTC mechanism 114 is an electric VTC mechanism that changes the relative rotational phase angle of air intake camshaft 115*a* relative to crankshaft 109 by means of an electric motor (brushed DC motor) acting as an actuator, thereby successively changing the phase of the valve operating angle of air intake valve 105, that is, the valve timing of air intake valve 105 in the advance angle direction and the retard angle direction.

Moreover, ignition plug 107 provided for each cylinder has an ignition module 116 for supplying ignition energy to ignition plug 107, ignition module 116 being directly mounted on ignition plug 107. Ignition module 116 includes a power transistor for controlling an ignition coil and energization to the ignition coil.

A control device (electronic control unit) 201 includes an electric VTC controller 201*a* for controlling the driving of VTC mechanism 114 and an engine control module (hereinafter, will be referred to as ECM) 201*b* for controlling, for example, fuel injection valve 106 and ignition module 116. Electric VTC controller 201*a* and ECM 201*b* are each provided with a microcomputer including, for example, a CPU, RAM, and ROM. The manipulated variables of various devices are calculated by performing arithmetic processing according to programs stored in advance in memory, e.g., ROM, and then the manipulated variables are output. Moreover, electric VTC controller 201*a* includes a driving circuit, e.g., an inverter for driving the motor of VTC mechanism 114.

Electric VTC controller 201*a* and ECM 201*b* are configured so as to transfer data to each other via a CAN (Controller Area Network) 201*c*.

In addition to electric VTC controller 201*a* and ECM 201*b*, an AT controller or the like for controlling, for example, an automatic transmission combined with an internal combustion engine is connected to CAN 201*c* that serves as a communication network.

Control device 201 receives, in addition to intake air flow QA output from intake air flow sensor 103, output signals from a crank angle sensor 203 for outputting a turning angle signal POS of crankshaft 109, an acceleration position sensor 206 for detecting the amount of pedaling of an accelerator pedal 207, that is, an accelerator position ACC, a cam angle sensor 204 for outputting a turning angle signal CAM of air intake camshaft 115*a*, a water temperature sensor 208 for detecting a temperature TW of coolant of internal combustion engine 100, an air-fuel ratio sensor 209 that is installed on exhaust pipe 111 upstream of catalyst converter 112 and detects an air-fuel ratio AF based on an oxygen concentration in exhaust gas, and an oil temperature sensor 210 for detecting an oil temperature TO of engine oil in an oil pan (or the circulation path of engine oil). Control device 201 further receives a signal IGNSW from an ignition switch (engine switch) 205 serving as a main switch for operating and stopping internal combustion engine 100.

Turning angle signal POS output by crank angle sensor 203 is a pulse signal for each unit crank angle (e.g., 10 degrees C.A) and is constructed to have at least one missing pulse for each crank angle (a crank angle of 180 degrees in a four-cylinder engine) corresponding to a stroke phase difference between cylinders (ignition interval).

Crank angle sensor 203 can be configured to output turning angle signal POS (unit crank angle signal) for each unit crank angle and a reference crank angle signal for each crank angle corresponding to a stroke phase difference between cylinders (ignition interval). In this case, the output position of a missing portion of turning angle signal POS for each unit crank angle or the reference crank angle signal indicates a reference piston position for each cylinder.

Cam angle sensor 204 outputs turning angle signal CAM at each crank angle corresponding to a stroke phase difference between cylinders (ignition interval).

In this case, air intake camshaft 115*a* rotates at a half speed of the rotation speed of the crankshaft 109. Thus, if internal combustion engine 100 is a four-cylinder engine and a crank angle corresponding to a stroke phase difference between cylinders (ignition interval) is 180 degrees C.A, the crank angle of 180 degrees C.A corresponds to a turning angle of 90 degrees of the air intake camshaft 115*a*. In other words, each time the air intake camshaft 115*a* is rotated 90 degrees, cam angle sensor 204 outputs turning angle signal CAM.

Turning angle signal CAM is a signal (cylinder identification signal) for identifying a cylinder located at the reference piston position. Turning angle signal CAM is output as a pulse having the property of indicating a cylinder number for each crank angle corresponding to a stroke phase difference between cylinders (ignition interval).

For example, in the case of a four-cylinder engine in which a first cylinder, a third cylinder, a fourth cylinder, and a second cylinder are sequentially ignited, cam angle sensor 204 outputs a single pulse signal, three pulse signals, four pulse signals, and two pulse signals at respective crank angles of 180 degrees, thereby identifying the cylinder located at the reference piston position based on a pulse number. Alternatively, turning angle signal CAM can indicate the cylinder number based on a pulse width or an amplitude instead of a pulse number.

Figure 2:
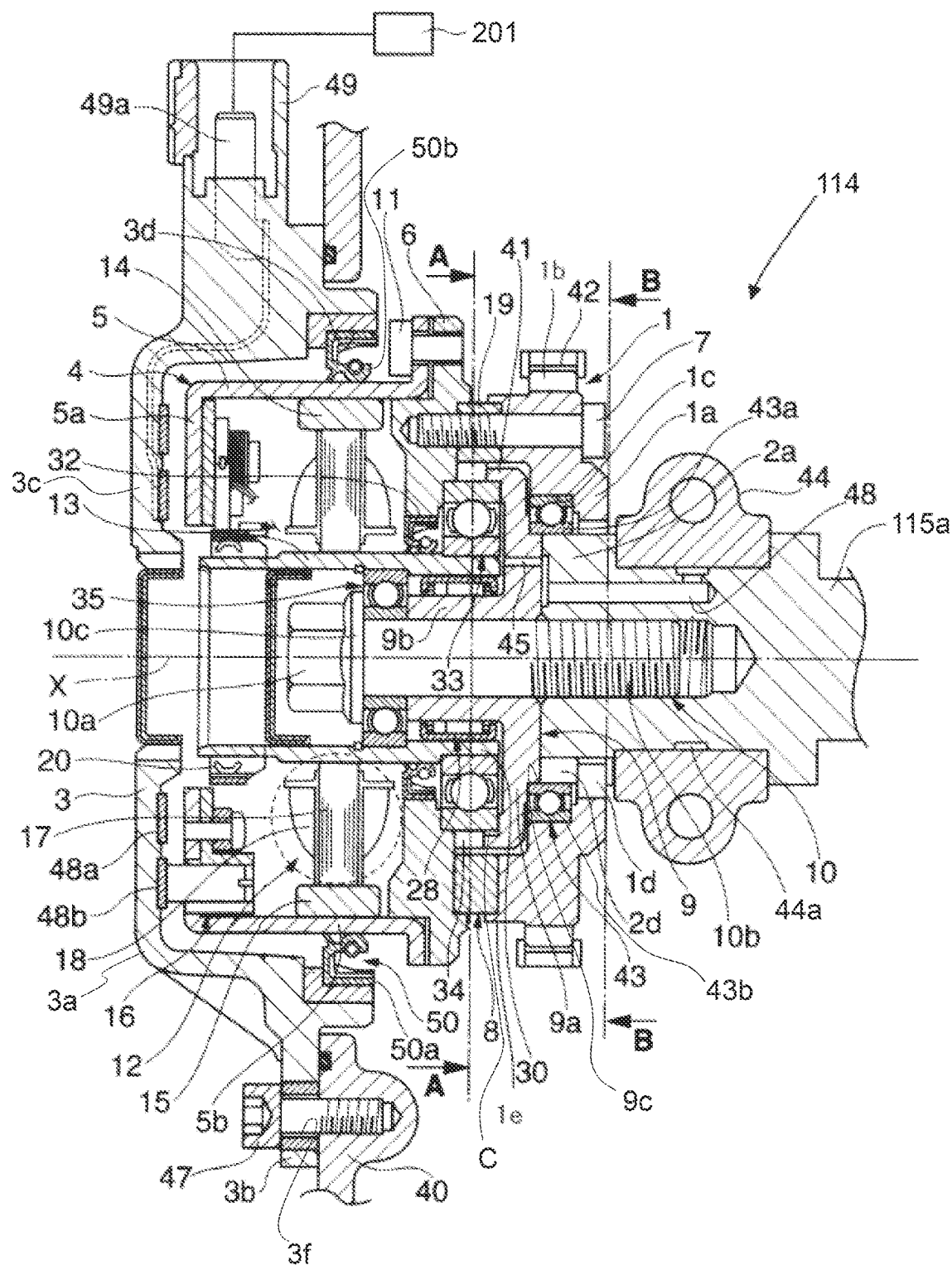
FIG. 2 is a cross-sectional view illustrating the variable valve timing mechanism in FIG. 1.
Figure 3:
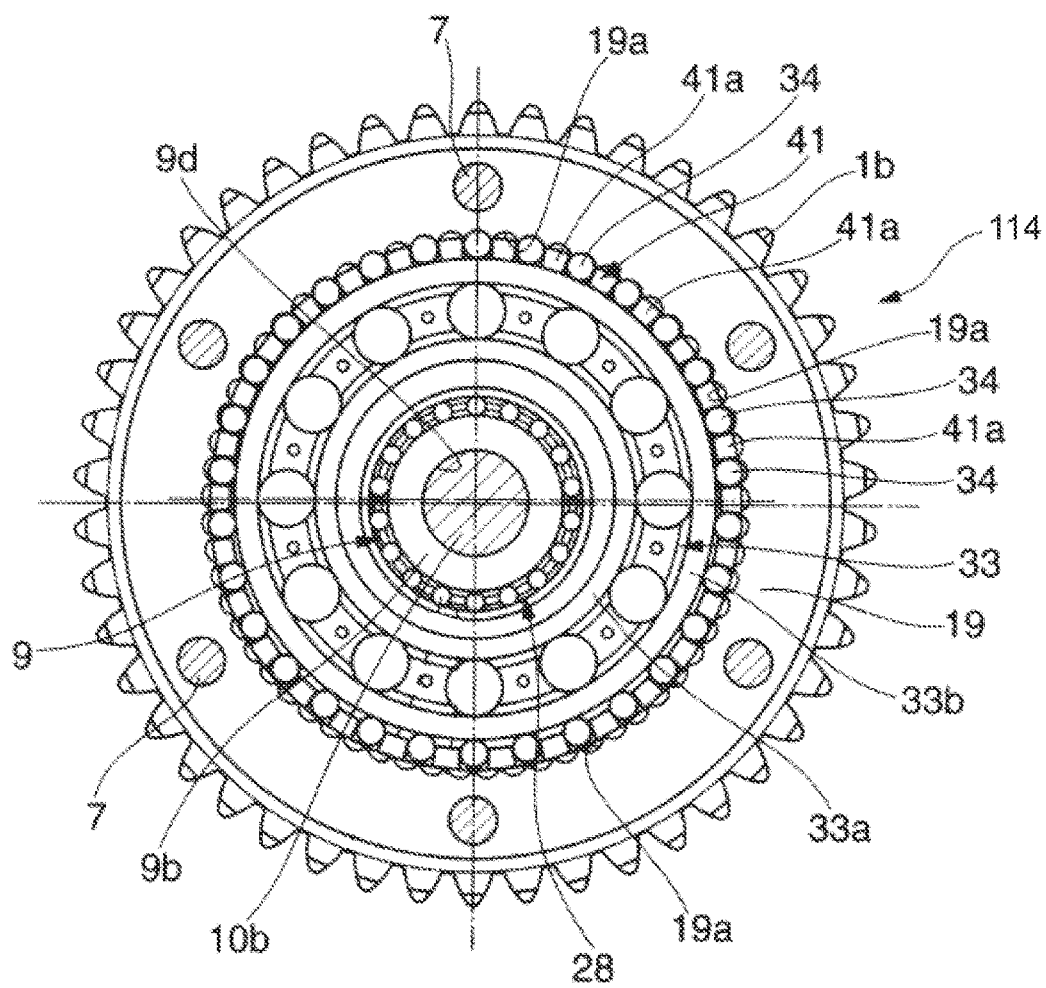
FIG. 3 is a cross-sectional view taken along line A-A of FIG. 2.
Figure 4:
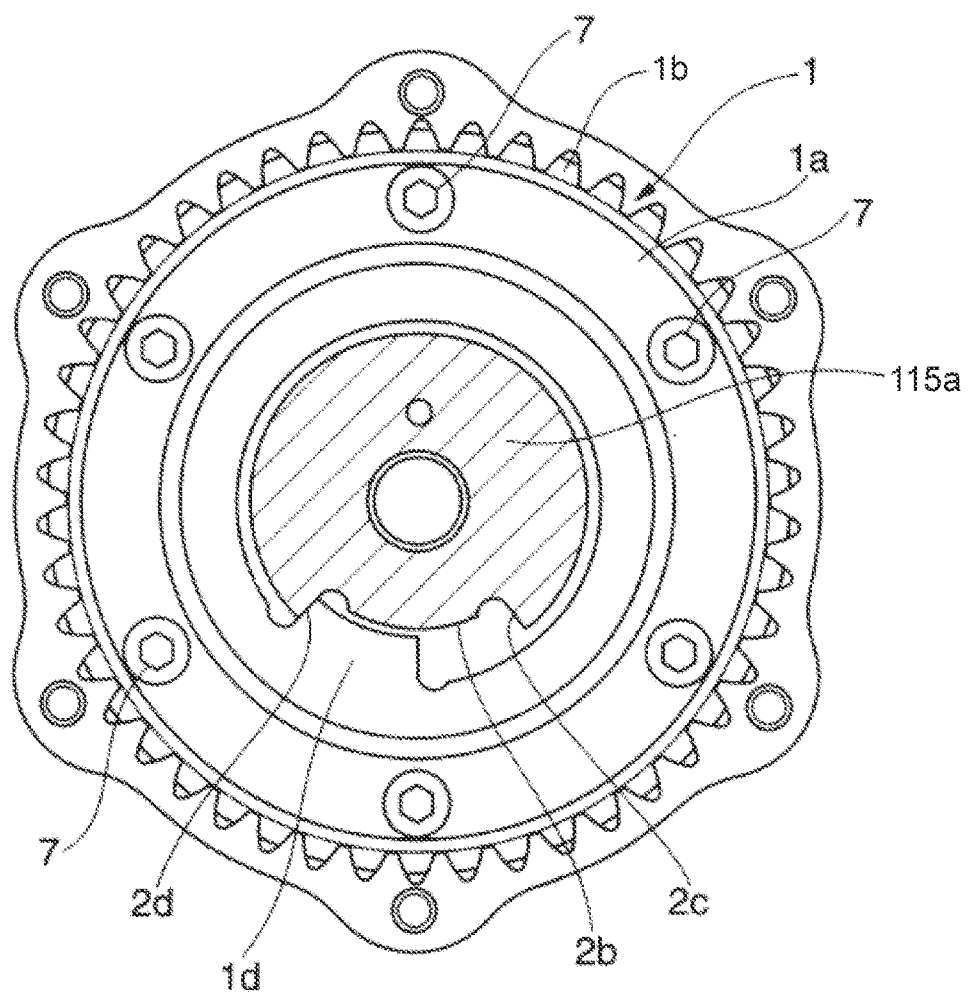
FIG. 4 is a cross-sectional view taken along line B-B of FIG. 2.

FIGS. 2 to 4 each illustrate an example of the structure of VTC mechanism 114 in FIG. 1.

The structure of VTC mechanism 114 is not limited to those illustrated in FIGS. 2 to 4, provided that a voltage is applied to a brushed DC motor only during phase conversion so as to rotate a motor shaft part relative to a sprocket part and convert the phase of a cam shaft part.

As illustrated in FIG. 2, VTC mechanism 114 includes a timing sprocket (cam sprocket) 1 serving as a driving rotor rotated by the crankshaft 109 of internal combustion engine 100, air intake camshaft 115*a* that is rotatably supported on a cylinder head with a bearing 44 interposed therebetween and is rotated by a torque transmitted from timing sprocket 1, a cover member 3 that is disposed at the front of timing sprocket 1 and is fixed to a chain cover 40 with a bolt, and a phase changing mechanism 4 that is disposed between timing sprocket 1 and air intake camshaft 115*a* and changes the relative rotational phase angle of air intake camshaft 115*a* relative to timing sprocket 1.

Timing sprocket 1 includes a sprocket body 1*a* and a gear part 1*b* that is integrated with the outer surface of sprocket body 1*a* and receives a torque from crankshaft 109 via a wound timing chain 42.

Moreover, timing sprocket 1 is rotatably supported on air intake camshaft 115*a* by a third ball bearing 43 that is interposed between a circular groove 1*c* formed on the inner surface of sprocket body 1*a* and the outer surface of a flange part 2*a* integrated with the front end of air intake camshaft 115*a*.

On the outer edge of the front end of sprocket body 1*a*, an annular protrusion 1*e* is integrally formed.

At the front end of sprocket body 1*a*, an annular member 19 and a ring-shaped plate 6 are both fastened and fixed with bolts 7 in the axial direction, annular member 19 being coaxially positioned on the inner surface of annular protrusion 1*e* with internal teeth 19*a* provided as wavy engaged portions on the inner surface of annular member 19.

As illustrated in FIG. 4, a stopper convex portion 1*d* provided as an arc-shaped engaging portion is formed on a part of the inner surface of sprocket body 1*a* so as to circumferentially extend over the range of a predetermined length.

On the outer surface of the front end of plate 6, a cylindrical housing 5 protruding forward is fixed with a bolt 11 so as to cover the components of a speed reducer 8 and an electric motor 12, which will be described later, for phase changing mechanism 4.

Housing 5 made of iron metals acts as a yoke and includes a holding part 5*a* shaped like an annular plate integrated with the front end of housing 5. The outer surface of housing 5 along with holding part 5*a* is entirely covered with cover member 3 with a predetermined clearance formed therebetween.

Air intake camshaft 115*a* has a driving cam (not illustrated) provided on the outer surface of air intake camshaft 115*a* so as to open air intake valve 105 and a driven member 9 joined as a driven rotor to the front end of air intake camshaft 115*a* with a cam bolt 10 in the axial direction.

Moreover, as illustrated in FIG. 4, flange part 2*a* of air intake camshaft 115*a* has a stopper concave groove 2*b* circumferentially formed as a locking part that receives engaged stopper convex portion 1*d* of sprocket body 1*a*.

Stopper concave groove 2*b* is formed into an arc with a predetermined length in the circumferential direction. Both edges of stopper convex portion 1*d* rotating in the range of the length come into contact with circumferentially facing edges 2*c* and 2*d*, respectively, thereby regulating the relative rotation position of air intake camshaft 115*a* relative to timing sprocket 1 on the maximum advance-angle side and the maximum retard-angle side.

In other words, the range of angle for moving stopper convex portion 1*d* in stopper concave groove 2*b* is the variable range of the relative rotational phase angle of air intake camshaft 115*a* relative to crankshaft 109, that is, the variable range of valve timing.

A bearing surface portion 10*c* like a flange is integrally formed on an edge near a shaft portion 10*b* of a head portion 10*a* of cam bolt 10. The outer surface of shaft portion 10*b* has an external thread portion screwed into an internal thread portion that is internally formed from the end of air intake camshaft 115*a* in the axial direction.

Driven member 9 is made of iron metals and includes, as illustrated in FIG. 3, a disk portion 9*a* formed at the front end of driven member 9 and a cylindrical portion 9*b* integrally formed at the rear end of driven member 9.

An annular step protrusion 9*c* is integrally provided substantially at the central position of the rear end of disk portion 9*a* in the radial direction, annular step protrusion 9*c* having substantially the same outside diameter as flange part 2*a* of air intake camshaft 115*a*.

Moreover, the outer surface of annular step protrusion 9*c* and the outer surface of flange part 2*a* are inserted into an inner ring 43*a* of third ball bearing 43. Third ball bearing 43 has an outer ring 43*b* that is press-fitted and fixed to the inner surface of circular groove 1*c* of sprocket body 1*a*.

On the outer surface of disk portion 9*a*, a holder 41 for holding a plurality of rollers 34 is integrally provided.

Holder 41 is formed so as to protrude from the outer surface of disk portion 9*a* in the same direction as cylindrical portion 9*b* and includes a plurality of long slender protrusions 41*a* circumferentially placed with predetermined clearances at substantially regular intervals.

Cylindrical portion 9*b* has an insertion hole 9*d* that penetrates at the center so as to receive inserted shaft portion 10*b* of cam bolt 10. The outer surface of cylindrical portion 9*b* has a first needle bearing 28.

Cover member 3 is made of a synthetic resin material and includes a cover body 3*a* expanded like a cup and a bracket 3*b* integrated with the outer surface of the rear end of cover body 3*a*.

Cover body 3*a* is disposed to substantially cover the rear end of housing 5 from the front end of phase changing mechanism 4, that is, a holding part 5*b* of housing 5 in the axial direction with a predetermined clearance formed between cover body 3*a* and housing 5. Bracket 3*b* is substantially ring-shaped and has bolt insertion holes 3*f* penetrating respective six bosses.

In cover member 3, bracket 3*b* is fixed to chain cover 40 via a plurality of bolts 47, and two inner and outer slip rings 48*a* and 48*b* are embedded and fixed into the inner surface of a front end 3*c* of cover body 3*a* such that the inner end faces of slip rings 48*a* and 48*b* are exposed.

Furthermore, the upper end of cover member 3 has a connector part 49 containing a connector terminal 49*a* fixed while being connected to slip rings 48*a* and 48*b* via a conductive member.

Connector terminal 49*a* receives power supply from a battery power supply, which is not illustrated, via control device 201.

Between the inner surface of the rear end of cover body 3*a* and the outer surface of housing 5, a first oil seal 50 having a large diameter is disposed as a seal member.

First oil seal 50 is substantially channel-shaped in cross section and includes a cored bar embedded in a substrate made of synthetic rubber. Annular base portion 50*a* is fit and fixed into a circular groove 3*d* formed on the inner surface of the rear end of cover body 3*a*.

Moreover, on the inner surface of annular base portion 50*a* of first oil seal 50, a seal surface 50*b* is integrally formed in contact with the outer surface of housing 5.

Phase changing mechanism 4 includes electric motor 12 that is substantially coaxially disposed at the front end of air intake camshaft 115*a* and speed reducer 8 that reduces the rotation speed of electric motor 12 and transmits the rotation speed to air intake camshaft 115*a*.

Electric motor 12 is a brushed DC motor including housing 5 serving as a yoke rotating integrally with timing sprocket 1, a motor shaft 13 serving as an output shaft rotatably provided in housing 5, a pair of semicircular permanent magnets 14 and 15 fixed to the inner surface of housing 5, and a stator 16 fixed to the inner bottom of holding part 5*a*.

Motor shaft 13 is cylindrical and acts as an armature. An iron-core rotor 17 having a plurality of poles is circumferentially fixed substantially at the central position of motor shaft 13 in the axial direction, and a magnetic coil 18 is circumferentially wound around iron-core rotor 17.

Furthermore, a commutator 20 is press-fit and fixed to the outer surface of the front end of motor shaft 13. For commutator 20, magnetic coil 18 is connected to separate segments as many as the number of poles of iron-core rotor 17.

Motor shaft 13 is rotatably supported on the outer surface of shaft portion 10*b* near head portion 10*a* of cam bolt 10 via needle bearing 28 serving as a first bearing and a fourth ball bearing 35 disposed on one side of needle bearing 28 in the axial direction.

At the rear end of motor shaft 13 near air intake camshaft 115*a*, a cylindrical eccentric shaft portion 30 is integrally provided to constitute a part of speed reducer 8.

Moreover, between the outer surface of motor shaft 13 and the inner surface of plate 6, a second oil seal 32 is provided as a friction member for preventing leakage of lubricating oil from the inside of speed reducer 8 to the inside of electric motor 12.

The inner circumstance of second oil seal 32 is elastically in contact with the outer surface of motor shaft 13, thereby providing a friction resistance for the rotation of motor shaft 13.

Speed reducer 8 is mainly composed of eccentric shaft portion 30 for making an eccentric rotational motion, a second ball bearing 33 serving as a second bearing circumferentially provided around eccentric shaft portion 30, rollers 34 circumferentially provided around second ball bearing 33, holder 41 that accepts a radial motion while holding rollers 34 in the rolling direction, and driven member 9 integrated with holder 41.

The axis of a cam face formed on the outer surface of eccentric shaft portion 30 is slightly misaligned from axis X of motor shaft 13 in the radial direction. Second ball bearing 33 and rollers 34 or the like are configured as a planetary engagement part.

Second ball bearing 33 has a large diameter and substantially entirely overlaps at the radial position of first needle bearing 28. Second ball bearing 33 has an inner ring 33a that is press-fit and fixed to the outer surface of eccentric shaft portion 30, and rollers 34 are always in contact with the outer surface of an outer ring 33b of second ball bearing 33.

Furthermore, an annular clearance C is formed around the outer ring 33b. Clearance C allows the overall second ball bearing 33 to radially move according to the eccentric rotation of eccentric shaft portion 30, that is, make an eccentric motion.

Rollers 34 are fit into internal teeth 19a of annular member 19 while radially moving according to the eccentric motion of second ball bearing 33, and rollers 34 are caused to radially make oscillatory movements while being guided by protrusions 41a of holder 41 in the circumferential direction.

Lubricating oil is supplied into speed reducer 8 from a lubricating oil supply mechanism.

The lubricating oil supply mechanism includes an oil supply line 44a that is formed in bearing 44 of the cylinder head and receives lubricating oil supplied from a main oil gallery, which is not illustrated, an oil supply orifice 48 that is formed in air intake camshaft 115a in the axial direction and communicates with oil supply line 44a via a groove, a small-diameter oil supply orifice 45 that is formed to penetrate driven member 9 in the axial direction and has one end opened to oil supply orifice 48 and the other end opened near first needle bearing 28 and second ball bearing 33, and three large-diameter oil drain holes (not illustrated) that are similarly formed to penetrate driven member 9.

The operations of VTC mechanism 114 will be described below.

First, timing sprocket 1 is rotated via timing chain 42 in response to the rotation of crankshaft 109 of internal combustion engine 100, and then a torque from timing sprocket 1 causes a synchronous rotation of electric motor 12 via housing 5, annular member 19, and plate 6.

The torque of annular member 19 is transmitted from rollers 34 to air intake camshaft 115a via holder 41 and driven member 9. Thus, the cam of air intake camshaft 115a opens and closes air intake valve 105.

When VTC mechanism 114 changes the relative rotational phase angle of air intake camshaft 115a relative to crankshaft 109, that is, the valve timing of air intake valve 105, control device 201 energizes magnetic coil 18 of electric motor 12 and drives electric motor 12. In response to a rotation of electric motor 12, the torque of the motor is transmitted to air intake camshaft 115a via speed reducer 8.

Specifically, when eccentric shaft portion 30 makes an eccentric rotation in response to a rotation of motor shaft 13, each roller 34 rolls from an internal tooth 19a of annular member 19 into an adjacent internal tooth 19a while being guided by protrusions 41a of holder 41 in the radial direction in each rotation of motor shaft 13. Rollers 34 come into rolling contact in the circumferential direction while sequentially repeating this process.

The rolling contact of rollers 34 transmits a torque to driven member 9 while reducing the rotation speed of motor shaft 13. A reduction ratio upon the transmission of the rotation of motor shaft 13 to driven member 9 can be optionally set according to, for example, the number of rollers 34.

This allows air intake camshaft 115a to rotate forward and backward relative to timing sprocket 1 so as to change the relative rotational phase angle, thereby changing the opening/closing timing of air intake valve 105 to the advance angle side or the retard angle side.

In this case, the forward and backward rotation of air intake camshaft 115a relative to timing sprocket 1 is regulated by bringing each side of stopper convex portion 1d into contact with one of facing edges 2c and 2d of stopper concave groove 2b.

In other words, driven member 9 rotates in the same direction as the rotation direction of timing sprocket 1 according to an eccentric rotation of eccentric shaft portion 30, allowing one side of stopper convex portion 1d to come into contact with facing edge 2c on one side of stopper concave groove 2b so as to regulate a further rotation in the same direction. Thus, the relative rotational phase angle of air intake camshaft 115a relative to timing sprocket 1 is changed to the maximum on the advance angle side.

Driven member 9 rotates in the reverse direction from the rotation direction of timing sprocket 1, allowing the other side of stopper convex portion 1d to come into contact with facing edge 2d of stopper concave groove 2b so as to regulate a further rotation in the same direction. Thus, the relative rotational phase angle of air intake camshaft 115a relative to timing sprocket 1 is changed to the maximum on the retard angle side.

In this way, control device 201 performs variable control on the relative rotational phase angle of air intake camshaft 115a relative to crankshaft 109, that is, the valve timing of air intake valve 105 by controlling the energization of electric motor 12 of VTC mechanism 114.

Control device 201 calculates a target phase angle (in other words, a target advance angle, target valve timing, or a target conversion angle) based on the operating states of internal combustion engine 100, for example, an engine load, an engine speed, an engine temperature, and a starting condition; meanwhile, control device 201 detects the actual relative rotational phase angle of air intake camshaft 115a relative to crankshaft 109.

Furthermore, control device 201 performs feedback control on a rotational phase such that the manipulated variable of electric motor 12 is calculated and output to bring the actual relative rotational phase angle to the target phase angle. In the feedback control, control device 201 calculates the manipulated variable of electric motor 12 by, for example, proportional-plus-integral control based on a deviation of the actual relative rotational phase angle from the target phase angle.

Figure 5:
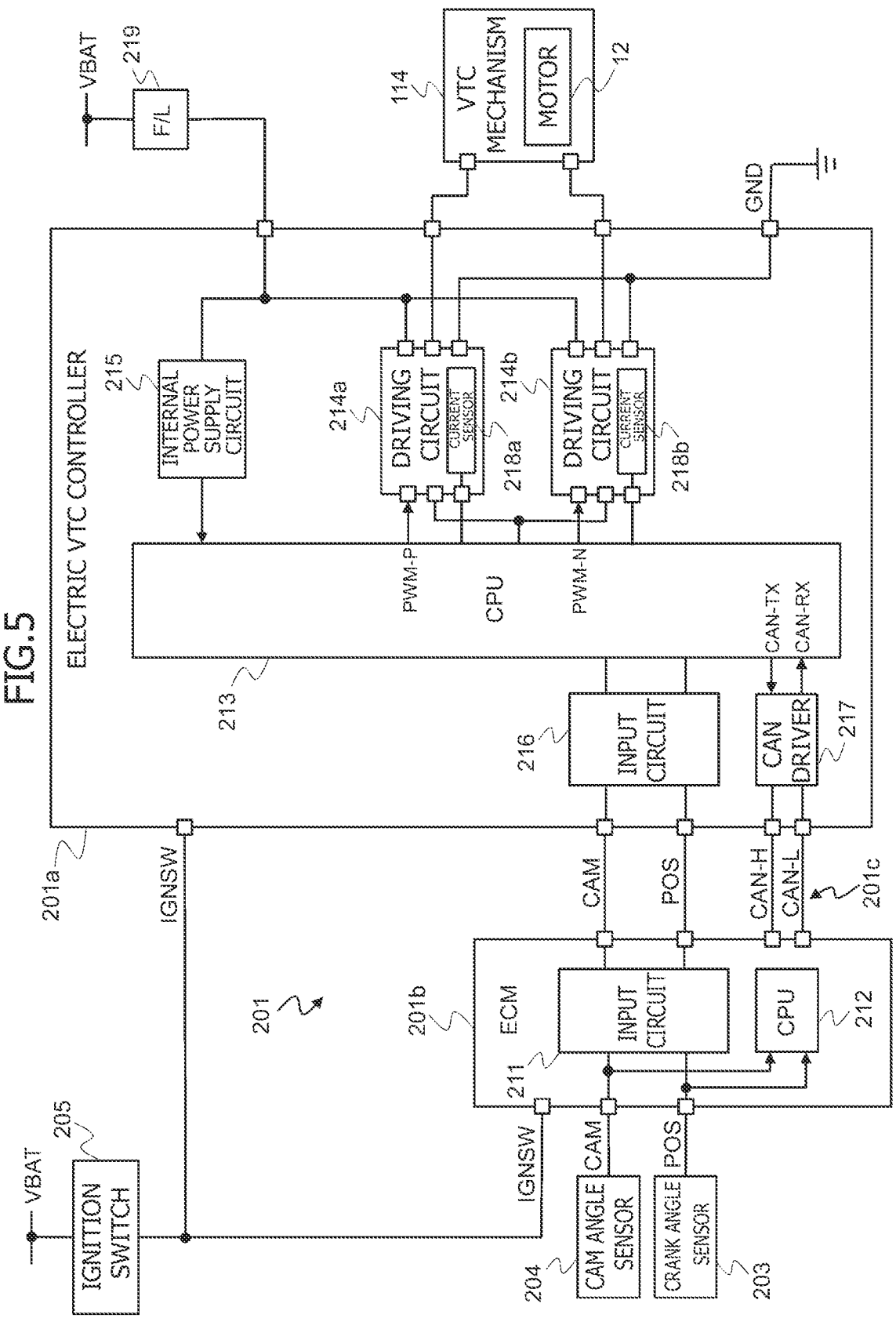
FIG. 5 is a block diagram illustrating an extracted principal part for the control of the variable valve timing mechanism in the control device illustrated in FIG. 1.

FIG. 5 illustrates an extracted principal part for the control of VTC mechanism 114 in control device 201 illustrated in FIG. 1. Signal IGNSW from ignition switch 205 connected to a battery VBAT is input to ECM 201b and electric VTC controller 201a and starts ECM 201b and electric VTC controller 201a by turning on the ignition. ECM 201b includes an input circuit 211 and a CPU 212. Turning angle signal CAM from cam angle sensor 204 and turning angle signal POS from crank angle sensor 203 are input to input circuit 211 and CPU 212. ECM 201b controls fuel injection valve 106 and ignition module 116 based on these signals.

CPU 212 calculates, for example, a target value (target phase angle) TGVTC (degrees C.A) of a rotational phase adjusted by VTC mechanism 114 based on the engine operating state and calculates a rotational phase ANG_C-AMec (degrees C.A) based on turning angle signal POS from crank angle sensor 203 and turning angle signal CAM of air intake camshaft 115a. CPU 212 further has the function of transmitting, for example, calculated target value TGVTC and calculated rotational phase ANG_CAMec to electric VTC controller 201a through CAN communications.

Electric VTC controller 201a includes a CPU 213, driving circuits 214a and 214b, an internal power supply circuit 215, an input circuit 216, and a CAN driver circuit 217. The supply terminal and the ground (GND) terminal of electric VTC controller 201a are connected to battery VBAT. This supplies power to driving circuits 214a and 214b and internal power supply circuit 215 via a fusible link 219. Internal power supply circuit 215 reduces the voltage of battery VBAT, generates an internal power supply voltage of, for example, 5 V, and supplies the voltage to circuits in electric VTC controller 201a including CPU 213.

Input circuit 216 receives turning angle signal CAM from cam angle sensor 204 and turning angle signal POS from crank angle sensor 203 via input circuit 211 of ECM 201b, and inputs turning angle signals CAM and POS to CPU 213.

CAN driver circuit 217 is provided for performing CAN communications between electric VTC controller 201a and ECM 201b. Transmission information CAN_TX from CPU 213 is transmitted to ECM 201b, and reception information CAN_RX from ECM 201b is received by CPU 213.

Driving circuits 214a and 214b control energization to electric motor 12 of VTC mechanism 114 based on PWM (Pulse Width Modulation) signals PWM-P and PWP-N output from CPU 213. Driving circuits 214a and 214b include current sensors 218a and 218b, respectively. Driving circuits 214a and 214b each detect a current passing through the winding of electric motor 12 and input the current to CPU 213.

Figure 6:
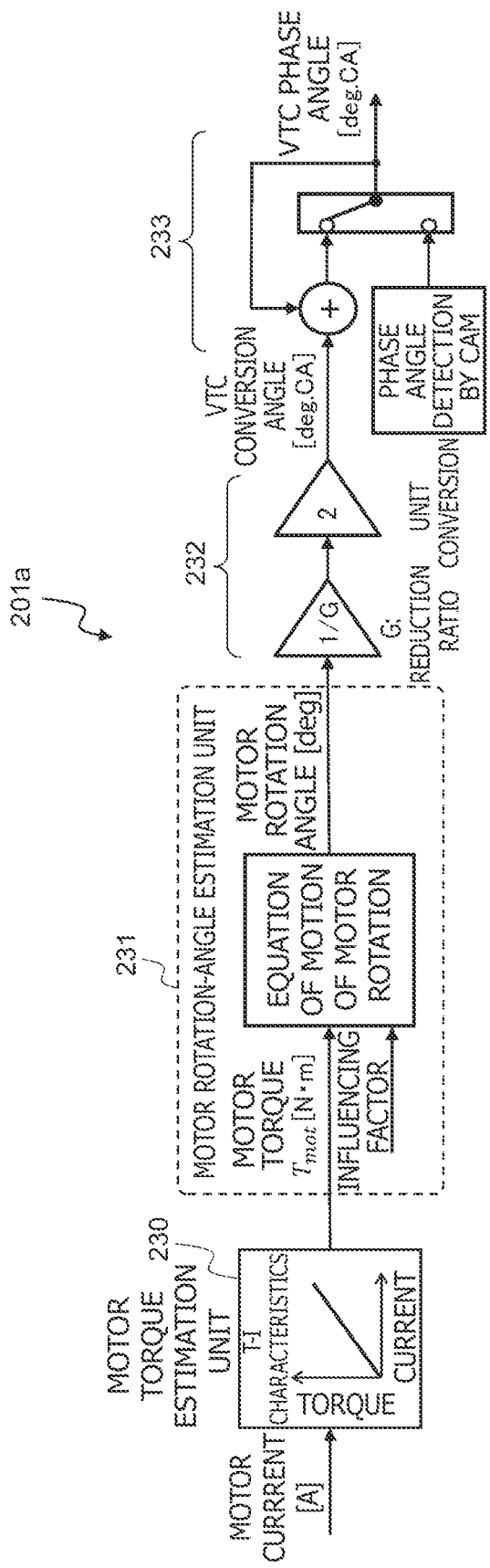
FIG. 6 is a functional block diagram illustrating an electric VTC controller in FIG. 5 as an explanatory drawing of the outline of the present invention.

Referring to the functional block diagram of FIG. 6, the outline of the present invention will be described below. Electric VTC controller 201a has the function of estimating a motor torque (motor torque estimation unit 230), the function of estimating a motor rotation angle (motor rotation-angle estimation unit 231), the function of calculating a VTC conversion angle (conversion unit 232), and the function of feedback control (feedback control unit 233). In interpolation between phase angle detections based on a cam signal, a motor torque is estimated from a motor current based on motor characteristics, and then a motor rotation angle is estimated to perform interpolation based on an equation of motion using the motor torque and an engine operating state.

Specifically, in response to the input of a motor current [A] to motor torque estimation unit 230, a motor torque Tmot [N·m] is calculated based on the T-I characteristics of a DC motor and is input to motor rotation-angle estimation unit 231. In motor rotation-angle estimation unit 231, the motor torque Tmot and influencing factors are input to the equation of motion of a motor rotation, and a motor rotation angle [deg] is calculated. Motor torque Tmot is expressed by the sum of the inertia of a VTC actuator, an influencing factor for the VTC actuator, and an influencing factor for a cam as below:

$$T_{mot} = J\frac{d^2\theta}{dt^2} + D\frac{d\theta}{dt} + T_{cam}$$

where J is a moment of inertia [kg·m<2>], D is a friction coefficient [N·m·sec/deg], and θ is a motor rotation angle [degrees C.A]. [Expression 1]

Motor rotation angle θ is estimated based on the equation of motion of a motor rotation, and then motor rotation angle θ is converted into a VTC conversion angle [degrees C.A] by conversion unit 232. In conversion unit 232, motor rotation angle θ calculated by motor rotation-angle estimation unit 231 is converted into a VTC conversion angle based on, for example, the reduction ratio of speed reducer 8. The VTC conversion angle is input to feedback control unit 233, and then phase angle values detected by the cam are interpolated by feedback control. Subsequently, a VTC phase angle [degrees C.A] is output from feedback control unit 233.

When a phase angle is detected by the cam, the detected value is selected, and then a VTC phase angle [degrees C.A] based on the phase angle detected value is output from feedback control unit 233.

The function of estimating a torque, the function of estimating a motor rotation angle, and the function of calculating a VTC conversion angle in electric VTC controller 201a are implemented by CPU 213. A PWM signal for the VTC phase angle [degrees C.A] is output to control electric motor 12 of VTC mechanism 114.

Figure 7A:
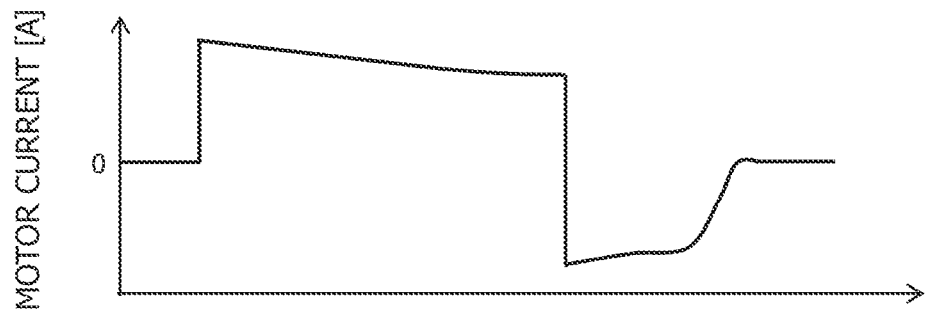
FIG. 7A is a characteristic diagram indicating a motor current while the phase angle interpolation of the present invention is applied to a VTC-phase step response.
Figure 7B:
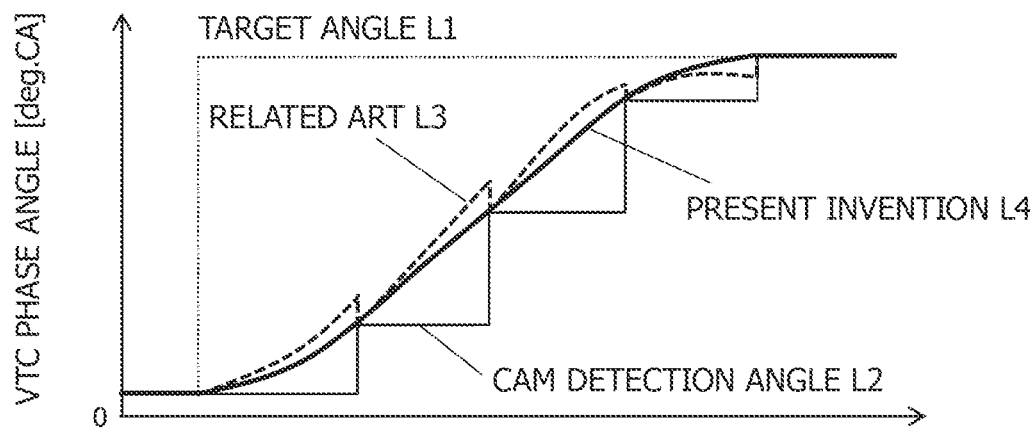
FIG. 7B is a characteristic diagram in which a phase angle is compared with that of the related art while the phase angle interpolation of the present invention is applied to a VTC-phase step response.
Figure 7C:
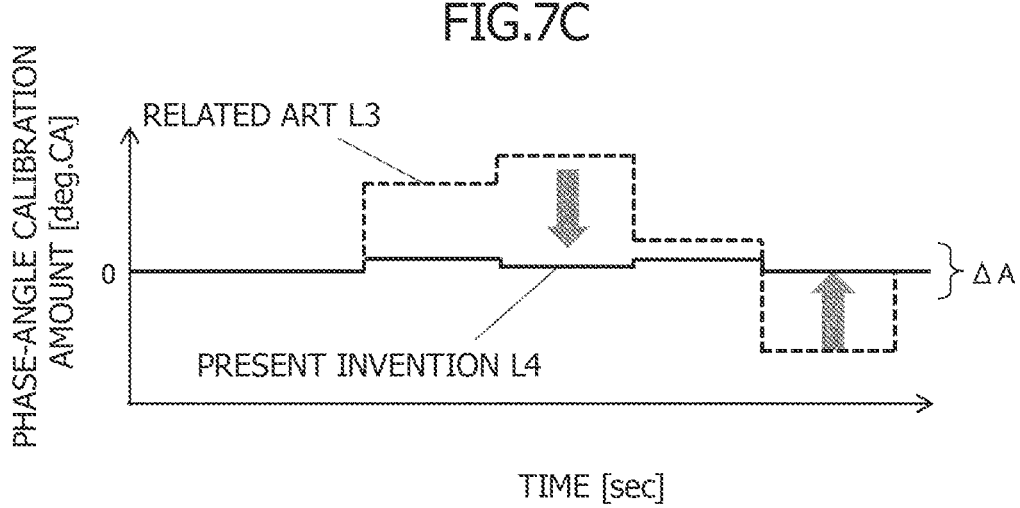
FIG. 7C is a characteristic diagram in which a phase-angle calibration amount is compared with that of the related art while the phase angle interpolation of the present invention is applied to a VTC-phase step response.
Figure 8:
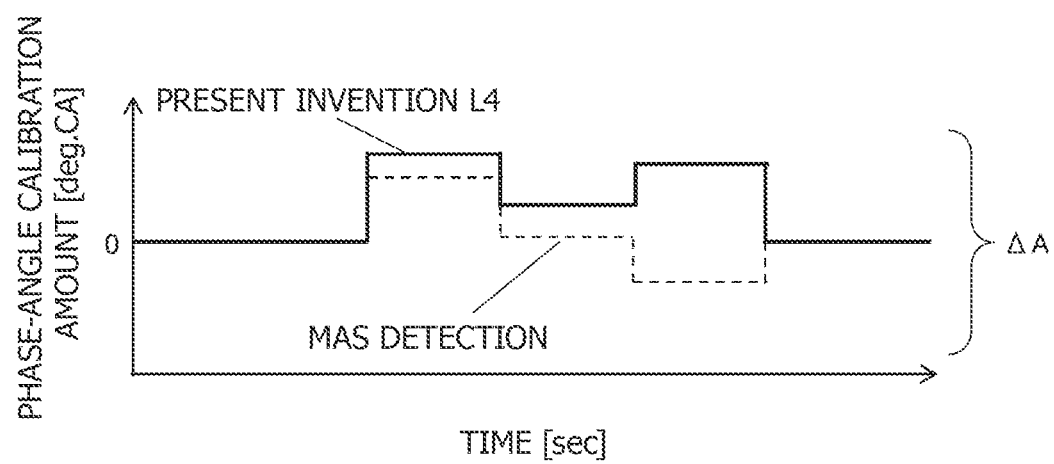
FIG. 8 is a characteristic diagram indicating an enlarged area in a change of the phase-angle calibration amount with time in FIG. 7C.

FIGS. 7A to 7C are characteristic diagrams in which a motor current, a phase angle, and a phase-angle calibration amount are compared with those of the related art while the phase angle interpolation of the present invention is applied to a VTC-phase step response. FIG. 8 is a characteristic diagram indicating an enlarged area AA in a change of the phase-angle calibration amount with time in FIG. 7C.

In a schematic flow of control according to the related art, a target angle (indicated by a thin broken line L1 in FIG. 7B) is first calculated by ECM 201b and is transmitted to electric VTC controller 201a. Electric VTC controller 201a calculates the manipulated variable of electric motor 12 (indicated by a thick broken line L3) based on a deviation of the received target angle from a VTC phase angle (a stepwise cam detection angle indicated by a thin solid line L2). A motor current (FIG. 7A) changes with the manipulated variable (driving voltage), and a VTC phase angle changes with the motor current.

In the present invention, the inertia of the VTC actuator (motor+speed reducer) is taken into consideration, thereby reproducing a VTC phase angle with a smooth transient as indicated by a thick solid line L4 in FIG. 7B without using a motor rotation angle sensor. Since the influencing factors are taken into consideration, a change (slope) closer to an actual change can be reproduced.

Thus, as indicated in FIG. 7C, the phase-angle calibration amount can be smaller than that of the related art. As indicated in FIG. 8, the phase-angle calibration amount is sufficiently small as in the use of a motor rotation angle sensor (solid line MAS).

First Embodiment

Figure 9:
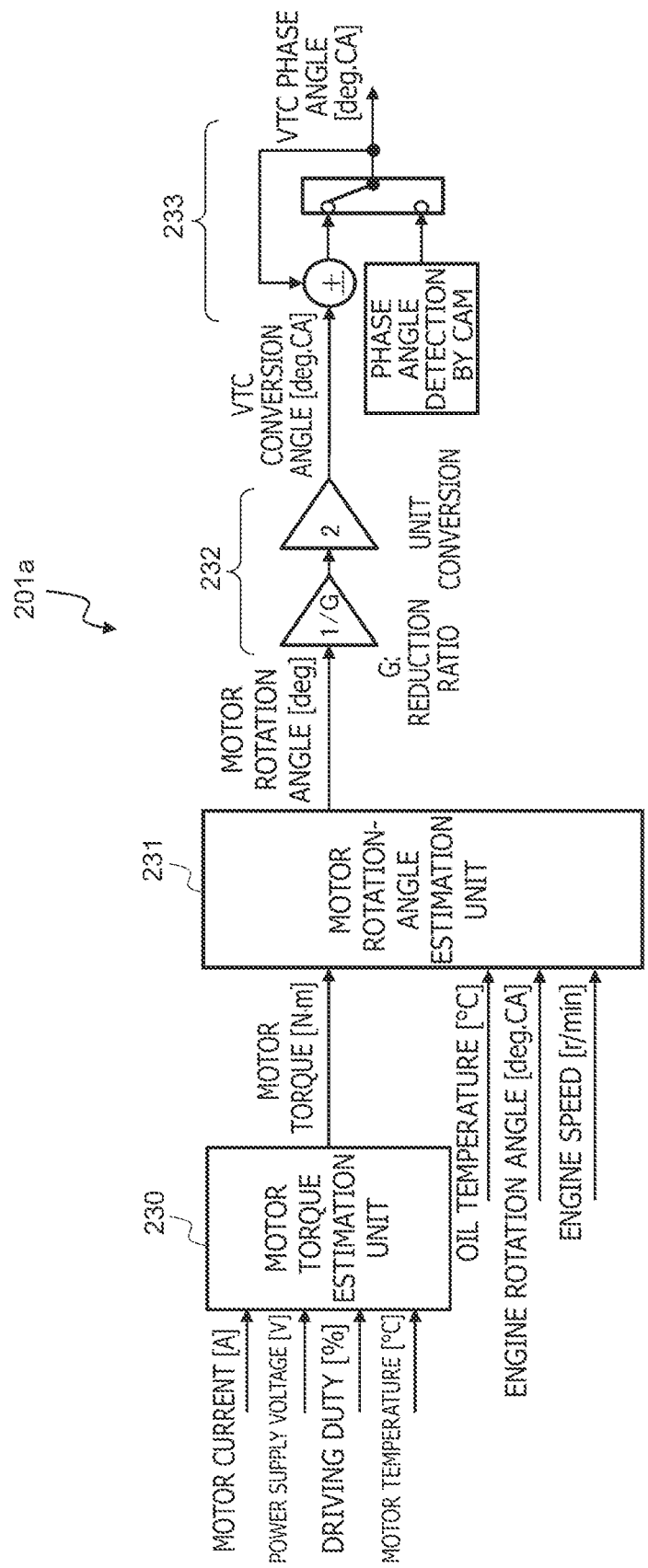
FIG. 9 is a block diagram for explaining a control device and a control method for a variable valve timing mechanism according to a first embodiment of the present invention.

FIG. 9 is an explanatory drawing of a control device and a control method for a variable valve timing mechanism according to a first embodiment of the present invention. FIG. 9 illustrates a more detailed configuration example of the functional block for interpolation between phase angle detections in FIG. 6. Electric VTC controller 201*a* includes motor torque estimation unit 230, motor rotation-angle estimation unit 231, conversion unit 232, and feedback control unit 233.

Motor torque estimation unit 230 receives a power supply voltage [V], a driving duty [%], and a motor temperature [° C.], which are influencing factors to be considered for an actuator, in addition to a motor current [A] and estimates a motor torque according to at least one of the motor current, the power supply voltage, the driving duty, and the motor temperature based on the characteristics of a DC motor. The motor torque is estimated by, for example, a calculation according to a polynomial expression, reference to a table, or reference to a map.

Motor rotation-angle estimation unit 231 receives the estimated motor torque [N·m] and influencing factors for an engine, for example, an oil temperature [° C.], an engine rotation angle [degrees C.A], and an engine speed [r/min]. A motor rotation angle [degrees] is estimated by using the motor torque, the engine speed, the engine rotation angle, and the oil temperature based on the equation of motion of a motor rotation.

Subsequently, the estimated motor rotation angle is input to conversion unit 232, the unit of the motor rotation angle is converted to a VTC conversion angle, and VTC phase angles are interpolated.

The VTC conversion angle [degrees C.A] obtained by the unit conversion and the cam signal are input to feedback control unit 233, and a VTC phase angle is detected by the cam signal. At this point, a phase angle interpolated value is calibrated to a detected value. The VTC conversion angle [degrees C.A] is then output from feedback control unit 233.

In this way, phase angle interpolation is performed based on the equation of motion in consideration of the influencing factors of VTC phase conversion, thereby improving the accuracy of phase angle interpolation according to a motor current.

Second Embodiment

Figure 10:
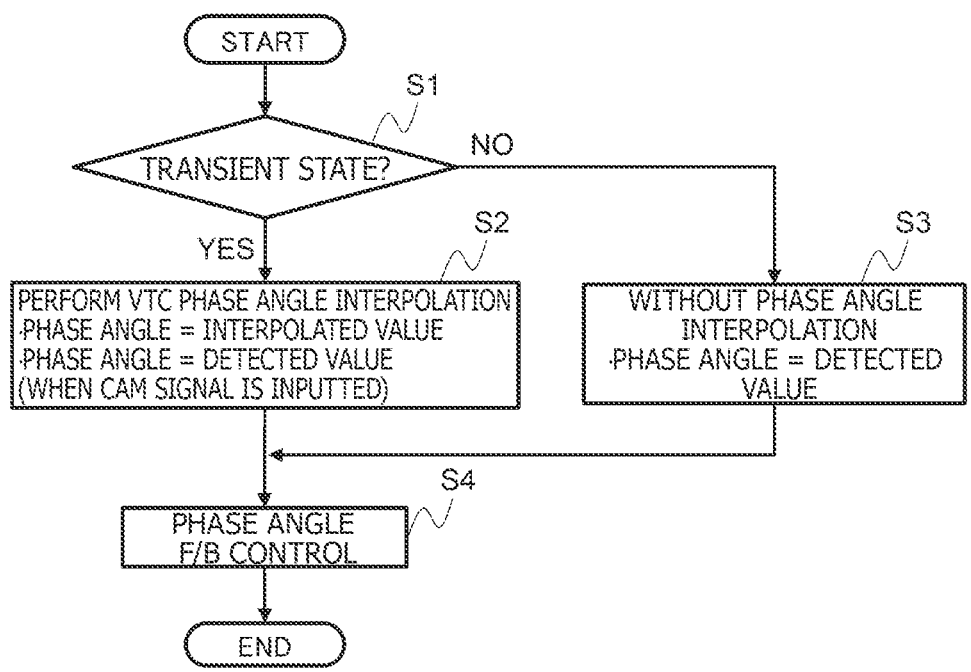
FIG. 10 is a flowchart for explaining a control device and a control method for a variable valve timing mechanism according to a second embodiment of the present invention.

FIG. 10 is a flowchart for explaining a control device and a control method for a variable valve timing mechanism according to a second embodiment of the present invention. In the second embodiment, phase angle interpolation is performed at the transient of phase angle control, whereas phase angle interpolation is not performed in a steady state. Specifically, whether phase angle control is in a transient state or not is first determined (step S1). If it is determined that phase angle control is in a transient state in which a phase angle is changed, VTC phase angle interpolation is performed (step S2). Whether phase angle control is in a transient state or not is determined according to a difference between a current phase angle and a target phase angle and/or the degree of change of the current phase angle. In step S2, an interpolated value is input as a phase angle or a detected value is input as a phase angle when the cam signal is input.

If it is determined in step S1 that phase angle control is not in a transient state, a phase angle is used as a detected value (rotating speed) without VTC phase angle interpolation (step S3). Subsequently, feedback (FB) control is performed on the phase angle (step S4).

In this way, interpolation is stopped when phase angle interpolation is not necessary, thereby reducing a computational load.

Modification

Figure 11:
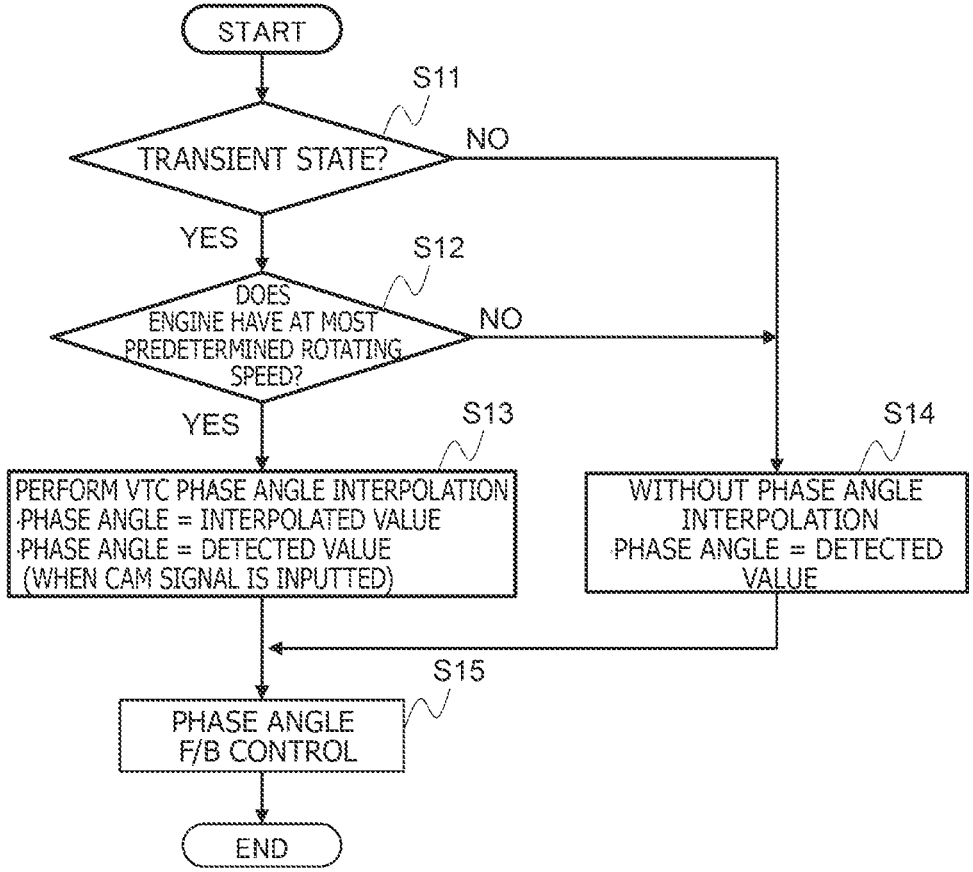
FIG. 11 is a flowchart for explaining a modification of the control device and the control method for the variable valve timing mechanism according to the second embodiment of the present invention.

FIG. 11 is a flowchart for explaining a modification of the second embodiment according to the present invention. In the present modification, whether an engine speed is at most a predetermined value or not is determined in addition to whether phase angle control is in a transient state or not. When the engine speed is at most the predetermined value, phase angle interpolation is performed. Otherwise phase angle interpolation is not performed. In other words, whether phase angle control is in a transient state or not is first determined (step S11). If it is determined that phase angle control is in a transient state, whether the engine has at most a predetermined rotating speed or not is determined (step S12). Whether phase angle control is in a transient state or not is determined according to a difference between a current phase angle and a target phase angle and/or the degree of change of the current phase angle.

If it is determined that the engine speed is at most the predetermined rotating speed, VTC phase angle interpolation is performed (step S13). In step S13, an interpolated value is input as a phase angle or a detected value is input as a phase angle when the cam signal is input.

If it is determined in step S1*l* that phase angle control is not in a transient state and if it is determined in step S12 that the engine speed does not have at most the predetermined rotating speed, a phase angle is used as a detected value (rotating speed) without VTC phase angle interpolation (step S14). Subsequently, feedback (FB) control is performed on the phase angle (step S15).

The engine rotations are taken into consideration because cam detection frequency increases as the engine speed increases and a cam detection period becomes shorter than a VTC control period when the engine speed exceeds a predetermined value. This eliminates the need for phase angle interpolation. Thus, a computational load can be reduced by stopping interpolation when phase angle interpolation is not necessary.

Third Embodiment

Figure 12A:
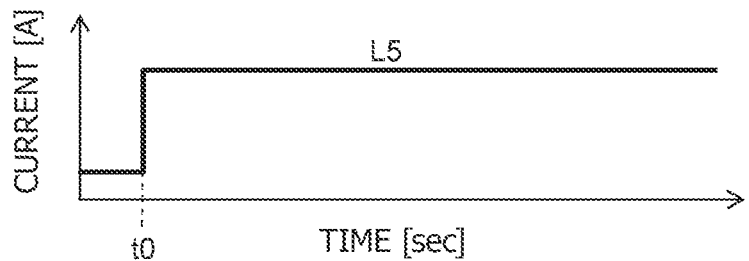
FIG. 12A is a waveform chart for explaining a control device and a control method for a variable valve timing mechanism according to a third embodiment of the present invention.
Figure 12B:
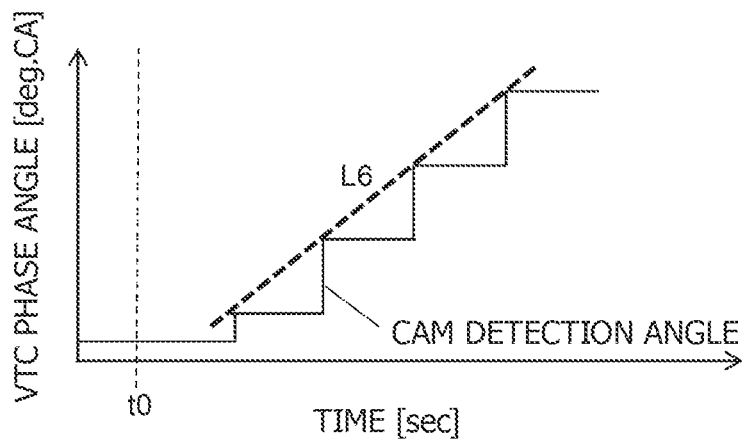
FIG. 12B is a waveform chart for explaining the control device and the control method for the variable valve timing mechanism according to the third embodiment of the present invention.

FIGS. 12A and 12B are waveform charts for explaining a control device and a control method for a variable valve timing mechanism according to a third embodiment of the present invention. In the third embodiment, the characteristics of an output (motor torque, motor rotation angle) relative to an input (motor current) are learned. The learning is performed, for example, before factory shipment, in a specific engine operating state (a certain engine speed or a certain oil temperature), or upon a learning request from a check tool.

In the flow of learning, a predetermined motor current is first supplied as indicated by a solid line L5 (see time t0 in FIG. 12A), and then the change characteristics of a VTC phase angle (=the change characteristics of a motor rotation angle) are learned. As indicated by a broken line L6, the change characteristics of a VTC phase angle are plotted like a straight line connecting the corners of a cam detection angle that changes like steps (see FIG. 12B).

Figure 13:
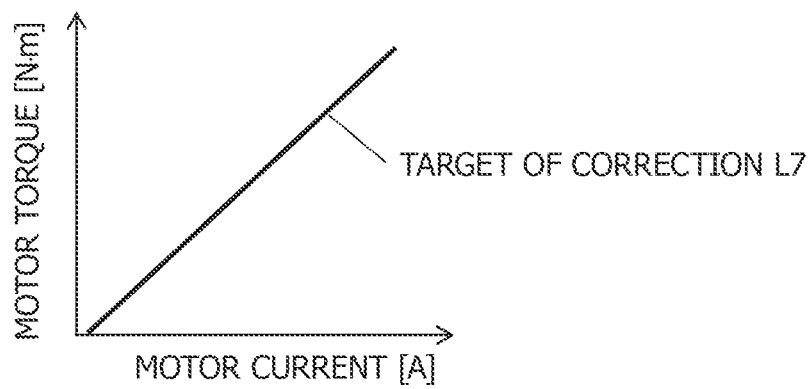
FIG. 13 is a characteristic diagram for explaining the correction of DC motor characteristics in FIGS. 12A and 12B.

In this way, DC motor characteristics (the slope of a solid line L7 in the T-I characteristics of FIG. 13) and the coefficients of the equation of motion (a moment of inertia J, a friction coefficient D) are corrected such that the change characteristics of a motor rotation angle relative to a motor current match an actual device.

Fourth Embodiment

Figure 14A:
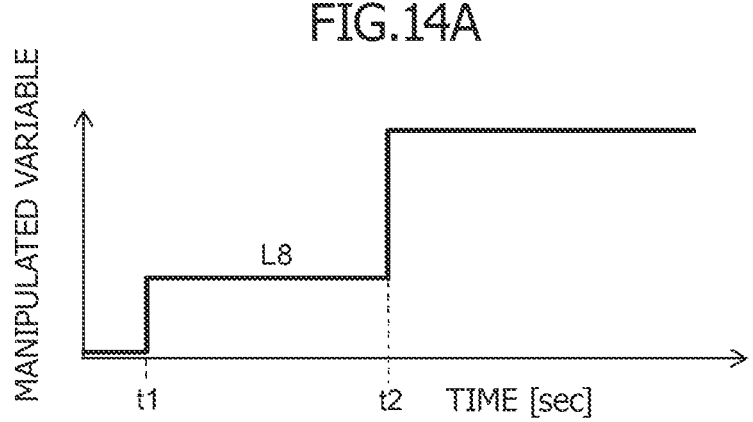
FIG. 14A is a waveform chart for explaining a control device and a control method for a variable valve timing mechanism according to a fourth embodiment of the present invention.
Figure 14B:
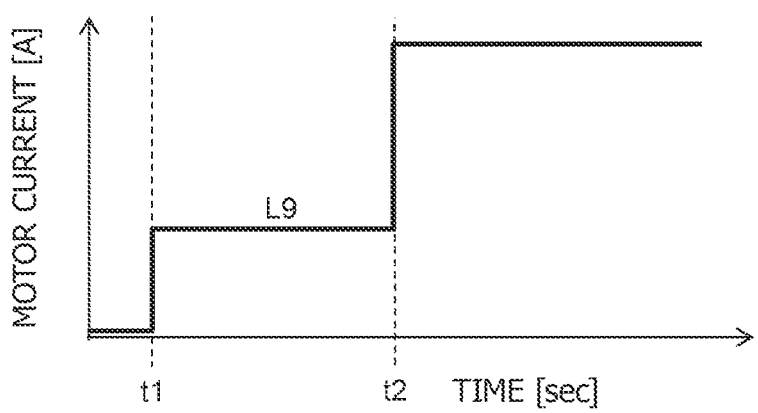
FIG. 14B is a waveform chart for explaining the control device and the control method for the variable valve timing mechanism according to the fourth embodiment of the present invention.

FIGS. 14A and 14B are waveform charts for explaining a control device and a control method for a variable valve timing mechanism according to a fourth embodiment of the present invention. In the fourth embodiment, a VTC manipulated variable (corresponding to the manipulated variable of electric motor 12) is learned. In this case, the manipulated variable is an amount for controlling a motor to bring a phase angle close to a target angle. The manipulated variable can be expressed by any one of a driving voltage, a duty, and a motor current. A sensor detected value can be used as the motor current. The motor current can be also estimated from a driving voltage according to the relationship "driving voltage=power supply voltage×duty." The learning is performed, for example, before factory shipment, in a specific engine operating state (a certain engine speed or a certain oil temperature), or upon a learning request from a check tool.

In the flow of learning, a predetermined VTC manipulated variable (a driving voltage [V] and a duty[%]) is first provided as indicated by a solid line L8 (see time t1 to time t2 in FIG. 14A), and then the detection characteristics of a motor current indicated by a solid line L9 are learned (see time t1 to time t2 in FIG. 14B).

Figure 15:
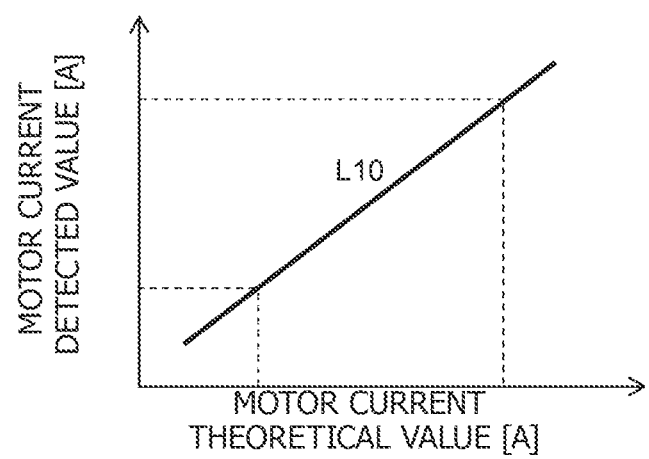
FIG. 15 is a characteristic diagram for explaining the correction of a detected value by using the detected values and the theoretical values of a motor current in FIGS. 14A and 14B.

Thereafter, as indicated in FIG. 15, a gain and an offset amount are calculated from the detected values and theoretical values of a motor current at two points as indicated by a solid line L10. The detected values are corrected by using the gain and the offset amount. In this way, a VTC manipulated variable is learned so as to address variations among current sensors and changes with time, thereby improving the accuracy of phase angle interpolation.

Fifth Embodiment

Figure 16:
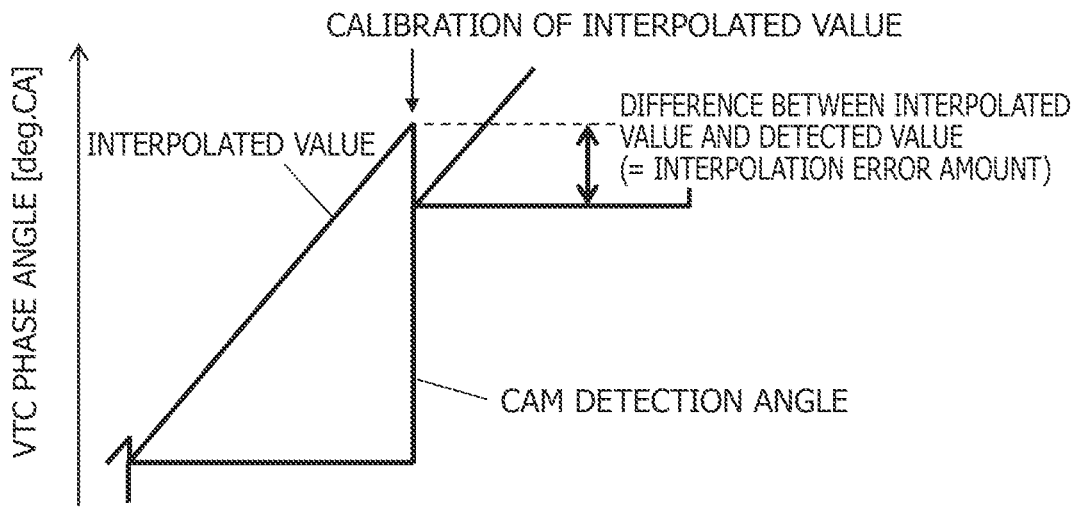
FIG. 16 is a waveform chart for explaining a control device and a control method for a variable valve timing mechanism according to a fifth embodiment of the present invention.

FIG. 16 is a waveform chart for explaining a control device and a control method for a variable valve timing mechanism according to a fifth embodiment of the present invention. In the first to fourth embodiments, a phase angle is determined in consideration of the predetermined influencing factors for motor characteristics. In the fifth embodiment, a slope is corrected according to a deviation of an interpolated value from a detected value of a cam. In other words, the calculation of a motor torque and/or a motor rotation angle is corrected according to a difference between an interpolated value and a detected value in the calibration of a phase angle.

In the flow of correction, an interpolated value is first calibrated when a cam detection angle is updated. Subsequently, DC motor characteristics and the coefficients and constants of the equation of motion are corrected according to a difference between the interpolated value and the detected value during calibration.

Figure 17:
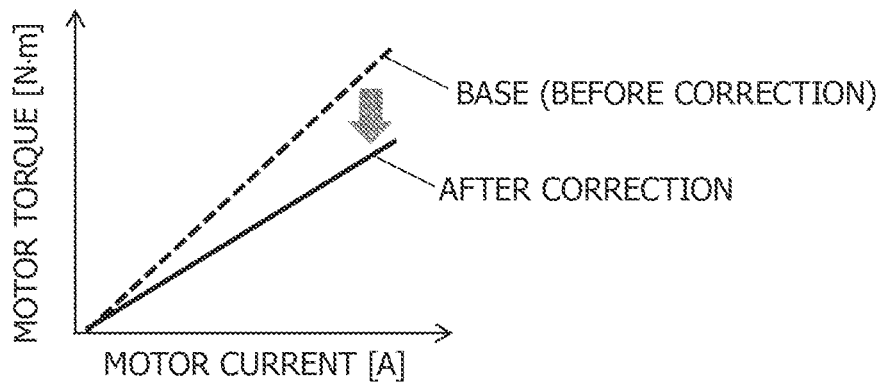
FIG. 17 is a characteristic diagram for explaining the correction of DC motor characteristics in FIG. 16.

If the DC motor characteristics (T-I characteristics) are corrected, the gain of the T-I characteristics is corrected so as to reduce a motor torque (motor rotation angle). Specifically, as indicated in FIG. 17, a broken line represents a base state before correction while a solid line represents a corrected state.

In this way, the slope is corrected so as to bring interpolation close to a detected value, thereby improving the accuracy of phase angle interpolation. In the correction of FIG. 16, the slope of motor characteristics is corrected to a smaller slope. The slope may be corrected to a steeper slope depending upon a difference between the interpolated value and the detected value.

FIG. 18 is a list of torques for the phase conversion of electric VTC and the influencing factors of the torques. The torques include a motor torque, an inertia torque (VTC actuator), a friction torque (VTC actuator), a cam torque, an inertia torque (engine), and a friction torque (engine). Phase angle interpolation is performed in consideration of various factors (a first order factor, a second order factor).

(A) A motor torque is a torque for converting the phase angle of a cam. A motor current serves as a first order factor while an applied voltage and a motor temperature serve as second order factors.

(B) An inertia torque (VTC actuator) is a torque serving as a resistance to a change of a motor torque. A motor-rotation-angle acceleration and an inertia moment serve as first order factors.

(C) A friction torque (VTC actuator) is a friction resistance torque for a VTC actuator, the friction resistance torque being applied in proportion to a motor rotation speed. The motor rotation speed and a friction coefficient serve as first order factors while an oil temperature serves as a second order factor.

(D) A cam torque is an alternating torque received from a valve according to an engine rotation angle. The engine rotation angle and an engine speed serve as first order factors.

(E) An inertia torque (engine) is a torque applied according to the acceleration and deceleration of an engine rotation. The engine-rotation-angle acceleration and an inertia moment serve as first order factors while an engine speed (actuator eigenvalue) serves as a second order factor.

(F) A friction torque (engine) is a friction resistance torque around a cam shaft. An engine speed and a friction coefficient serve as first order factors while an oil temperature serves as a second order factor.

Figure 19:
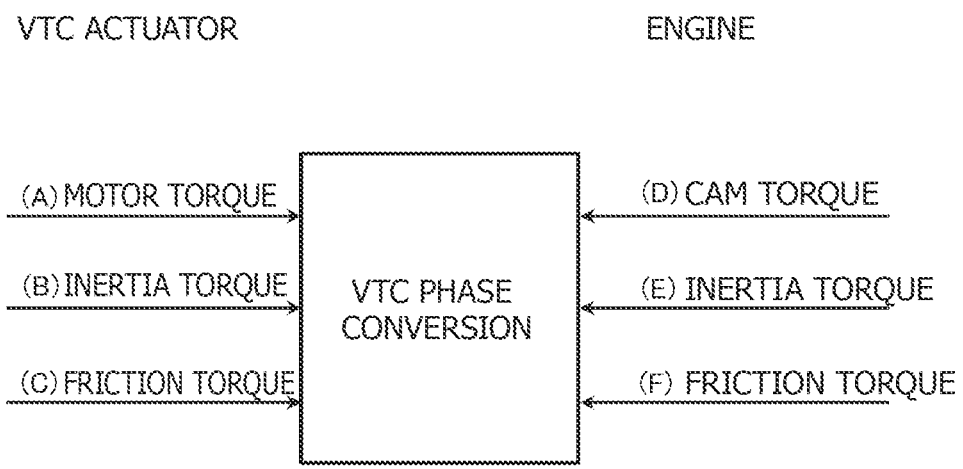
FIG. 19 is a schematic diagram for explaining actuator-side torques and engine-side torques for the phase conversion of electric VTC.

FIG. 19 is an explanatory drawing of an actuator-side torque and an engine-side torque that are relevant to the phase conversion of electric VTC in FIG. 18. The VTC actuator has (A) motor torque, (B) inertia torque, and (C) friction torque, whereas the engine has (D) cam torque, (E) inertia torque, and (F) friction torque.

The influencing factors of the torques will be specifically described below.

(A) Motor Torque

Figure 20:
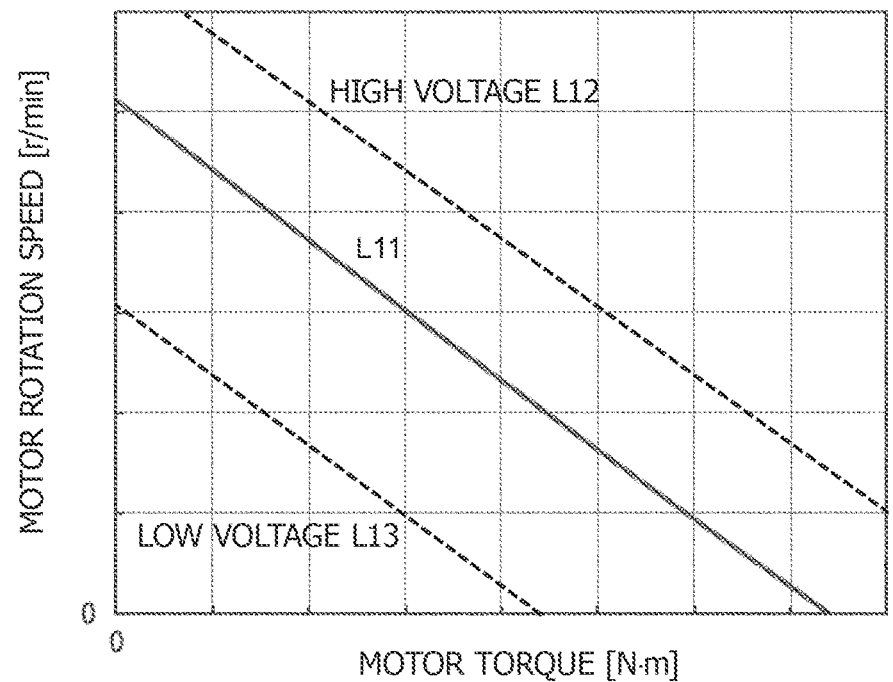
FIG. 20 is a characteristic diagram for explaining the influence of an applied voltage on a motor torque.

A motor torque is calculated from a motor current based on T-I characteristics. In the relationship between a motor torque and a motor rotation speed, the motor rotation speed decreases with an increase in motor torque as indicated by a solid line L11 in FIG. 20. At this point, if a high voltage is applied, the relationship between a motor torque and a motor rotation speed is determined as indicated by a broken line L12. If a low voltage is applied, the relationship between a motor torque and a motor rotation speed is determined as indicated by a broken line L13. In this way, the T-N characteristics change according to fluctuations in applied voltage.

Figure 21:
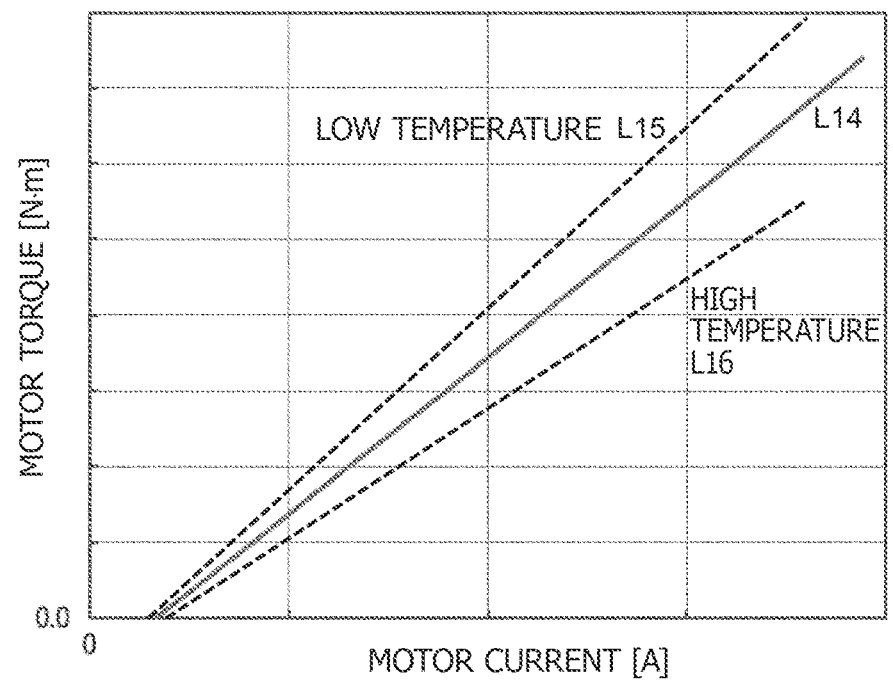
FIG. 21 is a characteristic diagram for explaining the influence of a motor temperature on a motor torque.

In the relationship between a motor current and a motor torque, a motor torque increases with a motor current as indicated by a solid line L14 in FIG. 21. At this point, the relationship between a motor current and a motor torque is determined as indicated by a broken line L15 at a low motor temperature. At a high motor temperature, the relationship between a motor current and a motor torque is determined as indicated by a broken line L16. In this way, the T-I characteristics change according to fluctuations in motor temperature.

(B) Inertia Torque (VTC Actuator)

Figure 22A:
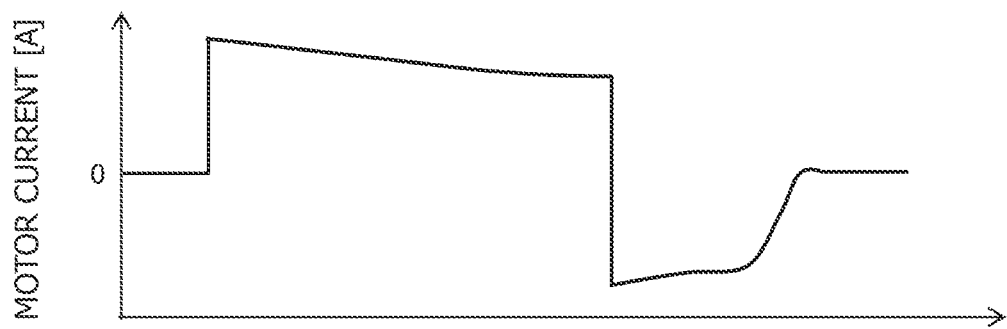
FIG. 22A is a characteristic diagram for explaining the estimation and interpolation of a VTC phase angle based on T-I characteristics and T-N characteristics in the absence of an inertia torque.
Figure 22B:
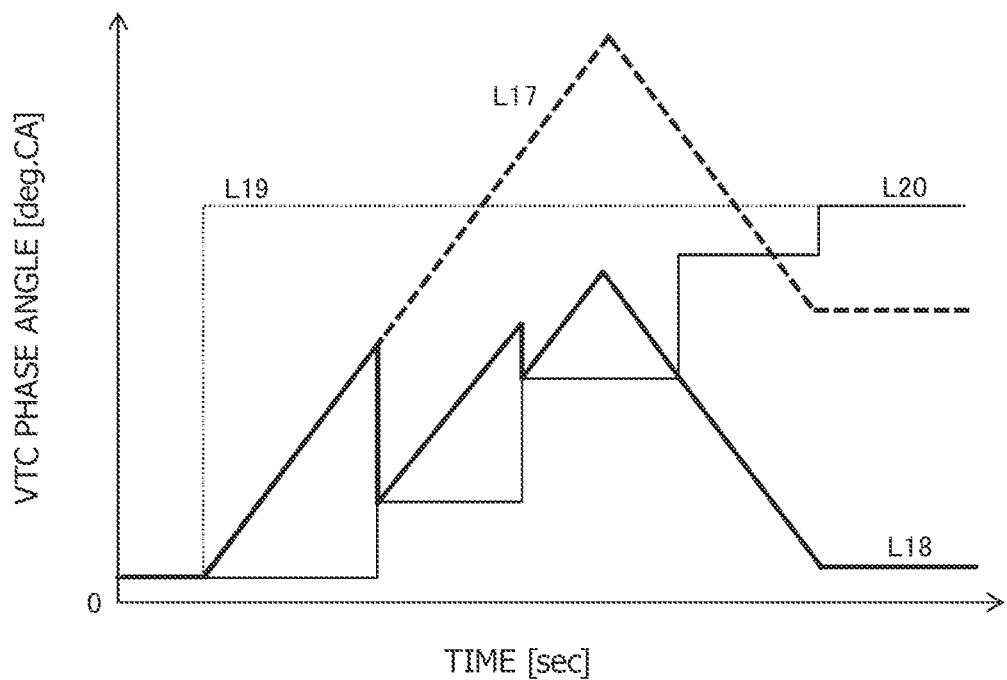
FIG. 22B is a characteristic diagram for explaining the estimation and interpolation of a VTC phase angle based on T-I characteristics and T-N characteristics in the absence of an inertia torque.

If a motor rotation angle is estimated and interpolated based on T-I characteristics and T-N characteristics (no inertia torque), the estimated value of a phase angle is obtained as indicated in FIG. 22B when a motor current changes as indicated in FIG. 22A. A thick broken line L17 indicates an estimated value without calibration while a thick solid line L18 indicates an interpolated value with calibration. A thin broken line L19 indicates a target angle while a thin solid line L20 rising like steps indicates a cam detection angle.

Figure 23:
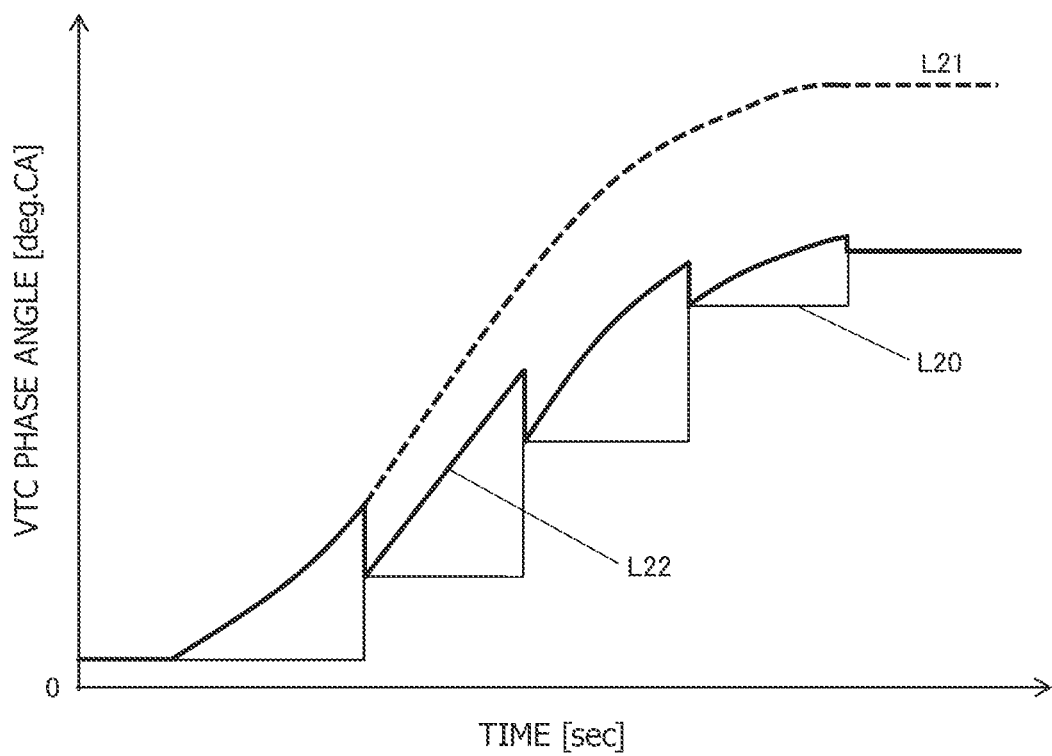
FIG. 23 is a characteristic diagram for explaining the estimation and interpolation of a VTC phase angle based on T-I characteristics and T-N characteristics in consideration of an inertia torque.

If an estimated value and an interpolated value are calculated in consideration of an inertia torque, an estimated value without calibration changes with a gentle slope as indicated by a thick broken line L21 in FIG. 23 while an interpolated value with calibration is smoothed as indicated by a thick solid line L22.

In this way, the inertia torque is taken into consideration, thereby reproducing a transient motion including the start and convergence of a smooth change of a phase angle.

(C) Friction Torque (VTC Actuator)

Figure 24:
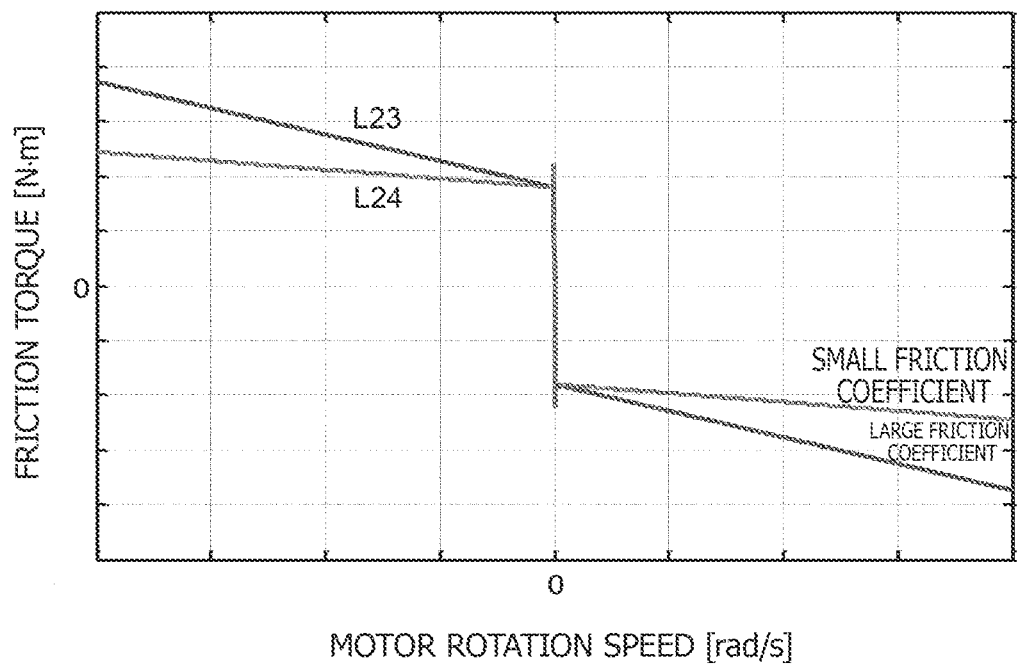
FIG. 24 is a characteristic diagram indicating the relationship between a motor rotation speed and a friction torque.
Figure 25:
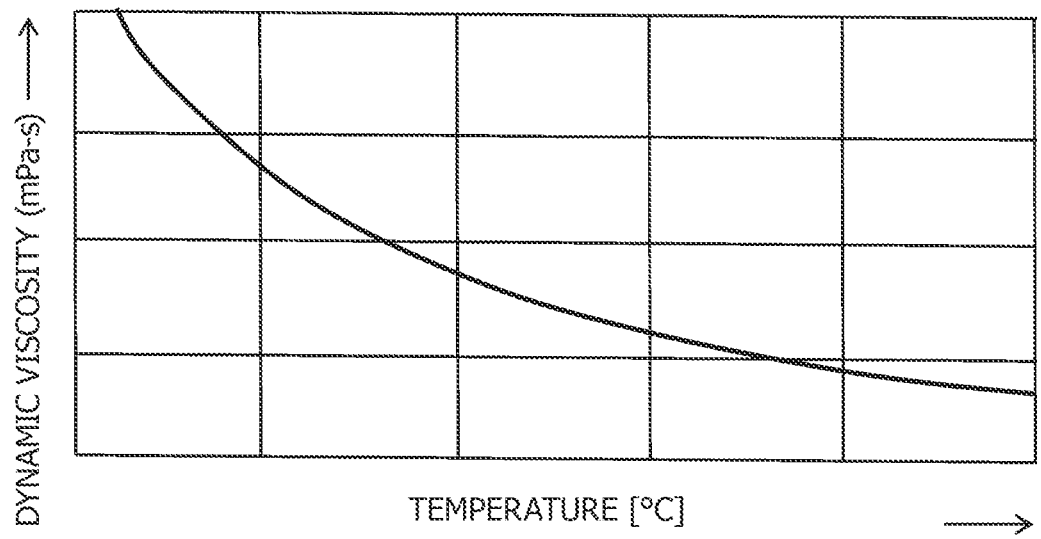
FIG. 25 is a characteristic diagram indicating the relationship between an oil temperature and a kinematic viscosity (friction coefficient)

As indicated in FIG. 24, a friction torque is applied in proportion to a motor rotation speed. A friction torque increases with a motor rotation speed. FIG. 25 indicates the relationship between an oil temperature and a kinematic viscosity (friction coefficient). A kinematic viscosity tends to increase with falling oil temperature depending upon the viscosity. In other words, the friction coefficient changes according to an oil temperature. A low friction coefficient causes a small change of the friction torque, whereas a high friction coefficient causes a large change of the friction torque.

In this way, the friction torque changes according to a motor rotation speed and a friction coefficient.

(C') Friction Torque (VTC Actuator)

Figure 26A:
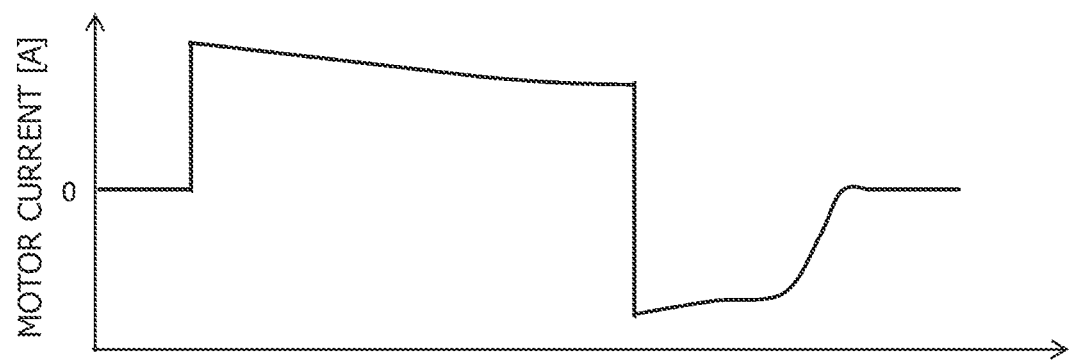
FIG. 26A is a characteristic diagram for explaining the estimation and interpolation of a VTC phase angle only in consideration of an inertia torque.
Figure 26B:
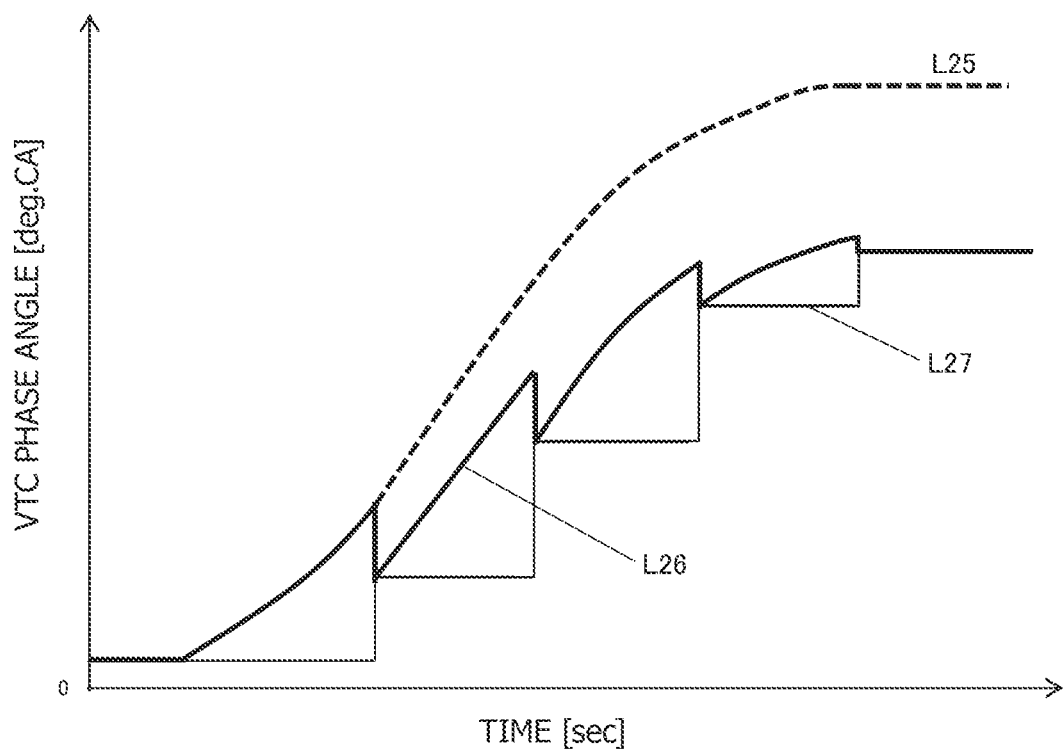
FIG. 26B is a characteristic diagram for explaining the estimation and interpolation of a VTC phase angle only in consideration of an inertia torque.

When a motor current changes as indicated in FIG. 26A, an estimated value and an interpolated value are calculated only in consideration of an inertia torque as indicated in FIG. 26B. A thick broken line L25 indicates an estimated value without calibration while a thick solid line L26 indicates an interpolated value with calibration. A thin solid line L27 rising like steps indicates a cam detection angle.

Figure 27:
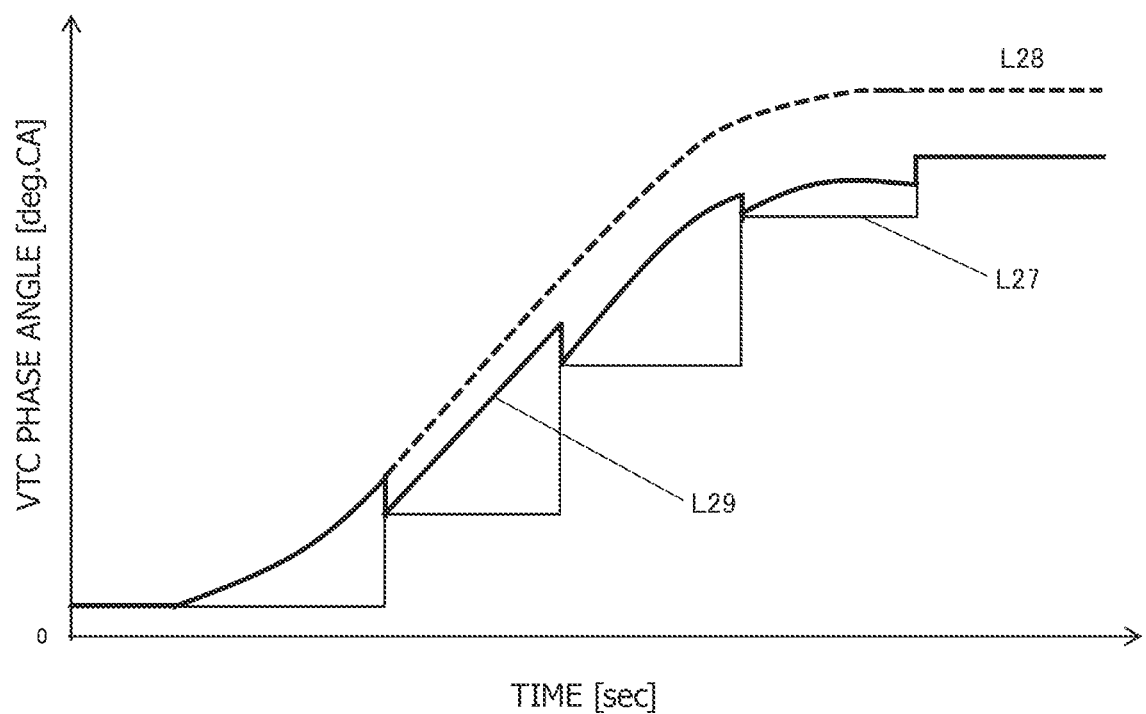
FIG. 27 is a characteristic diagram for explaining the estimation and interpolation of a VTC phase angle in consideration of an inertia torque and a friction torque.

The calculation of an estimated value and an interpolated value in consideration of both of an inertia torque and a friction torque reduces a change (slope) of a phase angle as indicated by a thick broken line L28 (an estimated value without calibration) and a thick solid line L29 (an interpolated value with calibration) in FIG. 27.

In this way, a friction coefficient changes according to an oil temperature while the friction torque changes according to a motor rotation speed and the friction coefficient. Thus, phase angle interpolation is performed in consideration of the inertia torque and the friction torque, thereby improving the accuracy of phase angle interpolation. For example, in FIG. 27, a change (slope) of a phase angle decreases, thereby improving the accuracy of phase angle interpolation.

(D) Cam Torque

Figure 28:
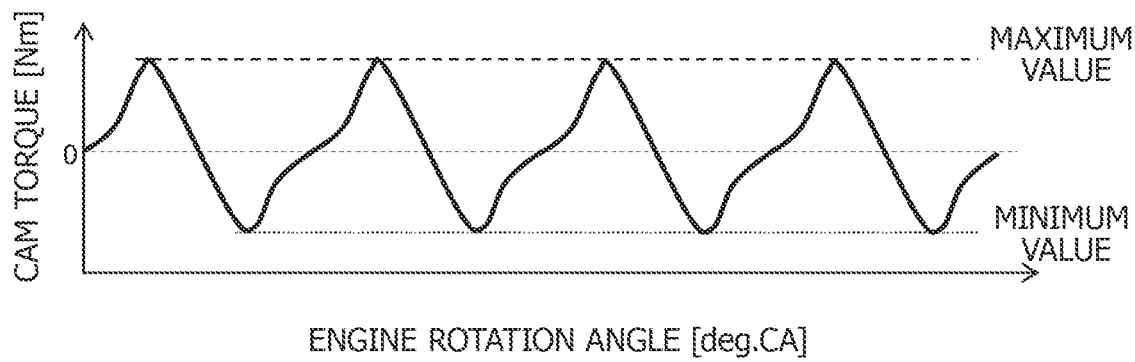
FIG. 28 is a characteristic diagram for explaining the influence of a cam torque for the phase conversion of electric VTC on the phase conversion.
Figure 29:
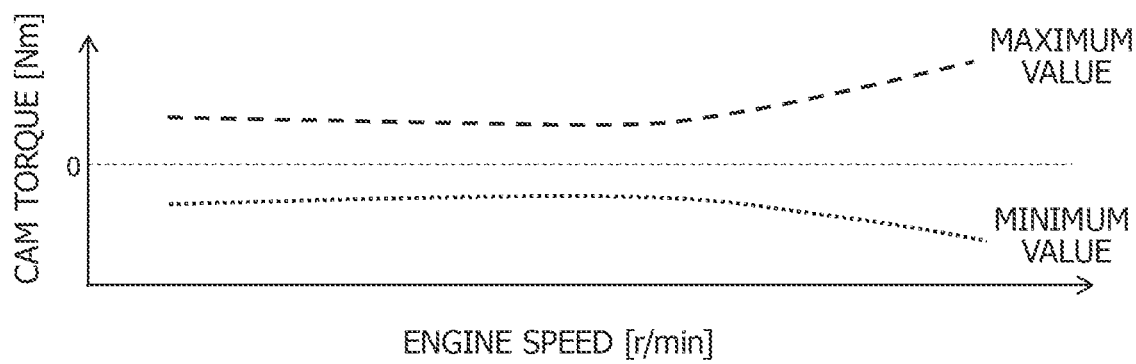
FIG. 29 is a characteristic diagram indicating the relationship between an engine speed and a cam torque.

As indicated in FIG. 28, a cam torque is alternately applied according to an engine rotation angle. As indicated in FIG. 29, the maximum value and the minimum value of an alternating torque change according to an engine speed.

In this way, a torque is alternately applied in VTC advance angle/retard angle directions according to the engine rotation angle, thereby affecting phase angle interpolation.

(D') Cam Torque

When a motor current changes as indicated in FIG. 26A, an estimated value and an interpolated value are calculated only in consideration of an inertia torque. An estimated value without calibration (broken line L25), an interpolated value with calibration (thick solid line L26), and a cam detection angle (thin solid line L27) are determined as indicated in FIG. 26B.

Figure 30:
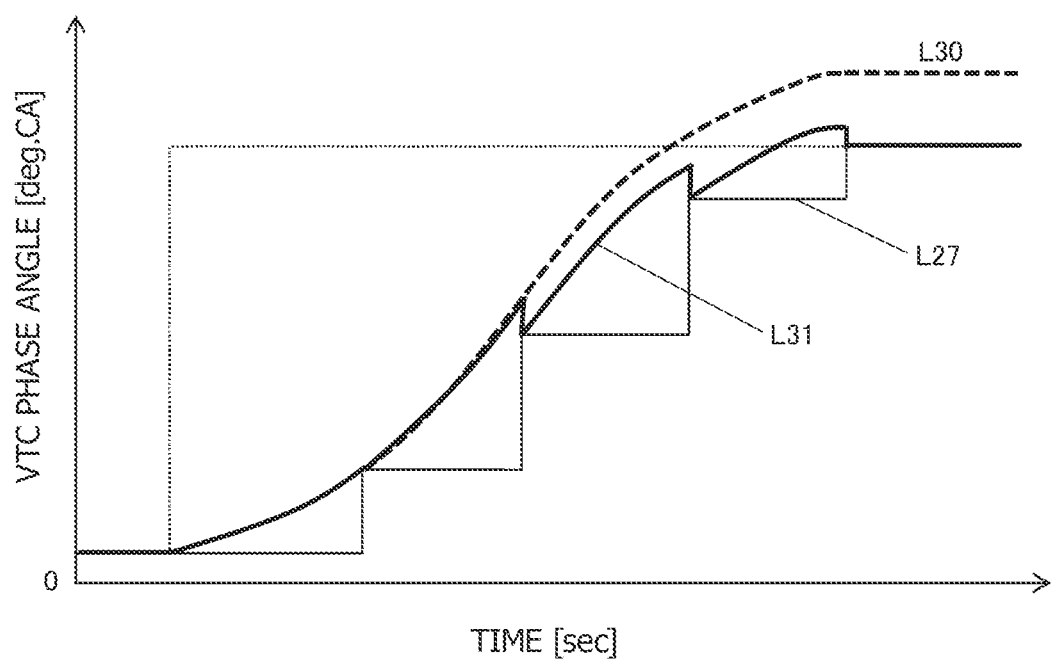
FIG. 30 is a characteristic diagram for explaining the estimation and interpolation of a VTC phase angle in consideration of an inertia torque and a cam torque.

The calculation of an estimated value and an interpolated value in consideration of both of an inertia torque and a cam torque reduces a change (slope) of a phase angle as indicated in FIG. 30. A thick broken line L30 indicates an estimated value without calibration while a thick solid line L31 indicates an interpolated value with calibration. A thin solid line L27 rising like steps indicates a cam detection angle.

In this way, a cam torque is alternately applied in VTC advance angle/retard angle directions according to the engine rotation angle and an engine speed. Thus, phase angle interpolation is performed in consideration of the inertia torque and the cam torque, thereby improving the accuracy of phase angle interpolation. For example, in FIG. 30, a change (slope) of a phase angle decreases, thereby improving the accuracy of phase angle interpolation.

(E) Inertia Torque (Engine)

When an engine speed is raised, a torque is applied to the motor shaft opposite to the direction of engine rotation (traveling direction) by inertia.

In this way, a torque is applied in VTC advance angle/ retard angle directions when the engine speed is raised, thereby affecting phase angle interpolation. The influence of a torque on phase conversion is taken into consideration, the torque being applied according to the acceleration and deceleration of the engine rotation. This can improve the accuracy of phase angle interpolation.

(F) Friction Torque (Engine)

A friction torque applied around the cam shaft serves as a resistance of a phase angle change. The friction torque (around the cam shaft) changes according to the engine speed. Moreover, the friction torque (around the cam shaft) changes according to fluctuations in kinematic viscosity (friction coefficient). The kinematic viscosity changes according to an oil temperature.

Thus, the accuracy of phase angle interpolation can be improved by taking the influence of a friction torque into consideration.

Hence, as indicated in FIGS. 18 and 19, phase angle interpolation is performed in consideration of various factors including a motor torque, an inertia torque (VTC actuator), a friction torque (VTC actuator), a cam torque, an inertia torque (engine), and a friction torque (engine), thereby improving the accuracy of cam phase angle interpolation. Additionally, cam phase angle interpolation can be performed without a motor rotation angle sensor, achieving cost reduction for a VTC system.

REFERENCE SYMBOL LIST

12 Electric motor (brushed DC motor)
100 Internal combustion engine (engine)
114 VTC mechanism
201 Control device
201a Electric VTC controller 201b Engine control module (ECM)
201c CAN
203 Crank angle sensor
204 Cam angle sensor
205 Ignition switch
210 Oil temperature sensor
214a, 214b Driving circuit
218a, 218b Current sensor
230 Motor torque estimation unit
231 Motor rotation-angle estimation unit
232 Conversion unit
233 Feedback control unit
IGNSW Signal from an ignition switch
TO Oil temperature
CAM Turning angle signal of an air intake camshaft
POS Turning angle signal of a crankshaft

The invention claimed is:

1. A control device for a variable valve timing mechanism configured to detect a phase angle of a cam based on a cam signal and control the phase angle of the cam by using an electric motor, wherein
the control device comprises a controller,
the controller comprising:
a motor torque estimation unit configured to receive a motor current, a power supply voltage, a driving duty, and a motor temperature and to estimate and output a motor torque according to at least one of the motor current, the power supply voltage, the driving duty, and the motor temperature based on characteristics of a DC motor;
a motor rotation-angle estimation unit configured to receive the motor torque output from the motor torque estimation unit and influencing factors for an engine and to estimate and output a motor rotation angle by using the motor torque, an engine speed, an engine rotation angle, and an oil temperature based on an equation of motion of a motor rotation;
a conversion unit configured to receive the motor rotation angle output from the motor rotation-angle estimation unit and to convert a unit of the motor rotation angle to a VTC conversion angle and output the VTC conversion angle; and
a feedback control unit configured to receive the VTC conversion angle output from the conversion unit and the cam signal and to, when a VTC phase angle is detected based on the cam signal, calibrate a phase angle interpolated value to a detected value and output a calibrated VTC phase angle, wherein
the controller is further configured to use the calibrated VTC phase angle to control the variable valve timing mechanism.

2. The control device for the variable valve timing mechanism according to claim 1, wherein the motor rotation angle is estimated by the motor rotation-angle estimation unit by a calculation based on the equation of motion indicating a balance of torque factors affecting change of a cam phase angle of the variable valve timing mechanism.

3. The control device for the variable valve timing mechanism according to claim 1, wherein the motor current is determined by using a sensor detected value or is estimated from a manipulated variable of the electric motor.

4. The control device for the variable valve timing mechanism according to claim 1, wherein the feedback control unit performs phase angle interpolation at a transient of phase angle control using the electric motor, whereas the feedback control unit does not perform the phase angle interpolation in a steady state.

5. The control device for the variable valve timing mechanism according to claim 1, wherein the feedback control unit performs phase angle interpolation when a first engine speed is equal to or less than a second engine speed at which a phase angle detection period based on the cam signal is equal to a calculation period of a manipulated variable of the electric motor, whereas the feedback control unit does not perform the phase angle interpolation when the first engine speed is higher than the second engine speed at which the phase angle detection period based on the cam signal is equal to a calculation period of a manipulated variable of the electric motor.

6. The control device for the variable valve timing mechanism according to claim 1, wherein the controller learns the motor rotation angle that is output relative to the motor current.

7. The control device for the variable valve timing mechanism according to claim 1, wherein the controller has a function of learning characteristics of motor current detection relative to a manipulated variable of the electric motor, wherein a gain and an offset amount are calculated from detected values and theoretical values of the motor current at two points and are used to correct the detected values.

8. The control device for the variable valve timing mechanism according to claim 1, wherein the controller corrects the calculation of at least one of the motor torque and the motor rotation angle according to a difference between an interpolated value and a detected value when the phase angle is calibrated.

9. A control method for a variable valve timing mechanism comprising a motor torque estimation unit, a motor rotation-angle estimation unit, a conversion unit, and a feedback control unit and configured to detect a phase angle of a cam based on a cam signal and control the phase angle of the cam by using an electric motor, the control method comprising:
estimating, by the motor torque estimation unit, a motor torque according to at least one of a motor current, a power supply voltage, a driving duty, and a motor temperature based on characteristics of a DC motor;
estimating, by the motor rotation-angle estimation unit, a motor rotation angle by using the motor torque estimated and influencing factors for an engine based on an equation of motion of a motor rotation;
converting, by the conversion unit, a unit of the motor rotation angle estimated to a VTC conversion angle and interpolating a VTC phase angle;
calibrating, by the feedback control unit, a phase angle interpolated value to a detected value and outputting a calibrated VTC phase angle obtained by converting the unit; and
using the calibrated VTC phase angle to control the variable valve timing mechanism.

10. The control method for the variable valve timing mechanism according to claim 9, wherein the motor rotation angle is estimated by the motor rotation angle estimation unit by a calculation based on the equation of motion indicating a balance of torque factors affecting the change of a cam phase angle of the variable valve timing mechanism.

11. The control method for the variable valve timing mechanism according to claim 9, further comprising determining, by the feedback control unit, whether phase angle control using the electric motor is in a transient state, wherein phase angle interpolation is performed at a transient of the phase angle control, whereas the phase angle interpolation is not performed in a steady state.

12. The control method for the variable valve timing mechanism according to claim 9, further comprising determining, by the feedback control unit, whether a first engine speed is equal to or less than a second engine speed at which a phase angle detection period based on the cam signal is equal to a calculation period of a manipulated variable of the electric motor, wherein phase angle interpolation is performed when the first engine speed is equal to or less than the second engine speed at which a phase angle detection period based on the cam signal is equal to a calculation period of a manipulated variable of the electric motor, whereas the phase angle interpolation is not performed when the first engine speed is higher than the second engine speed at which a phase angle detection period based on the cam signal is equal to a calculation period of a manipulated variable of the electric motor.

* * * * *